(12) United States Patent  (10) Patent No.: US 8,694,795 B1
Aissi  (45) Date of Patent: Apr. 8, 2014

(54) METHOD AND APPARATUS FOR SECURE APPLICATION EXECUTION

(71) Applicant: Visa International Service Association, San Francisco, CA (US)

(72) Inventor: Selim Aissi, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/056,873

(22) Filed: Oct. 17, 2013

Related U.S. Application Data

(63) Continuation of application No. 13/917,546, filed on Jun. 13, 2013.

(51) Int. Cl.
*G06F 12/14* (2006.01)
*G06F 21/57* (2013.01)
*G06F 21/30* (2013.01)
*G06F 21/44* (2013.01)

(52) U.S. Cl.
CPC .............. *G06F 21/57* (2013.01); *G06F 21/30* (2013.01); *G06F 21/44* (2013.01)
USPC ........................................................ 713/187

(58) Field of Classification Search
CPC ........ G06F 21/30; G06F 21/44; G06F 21/568
USPC ........................................................ 713/187
See application file for complete search history.

(56) References Cited

U.S. PATENT DOCUMENTS

| | | | |
|---|---|---|---|
| 6,880,079 B2 | 4/2005 | Kefford et al. | |
| 8,504,097 B1 | 8/2013 | Cope et al. | |
| 2003/0221114 A1* | 11/2003 | Hino et al. | 713/189 |
| 2006/0053284 A1* | 3/2006 | Feinleib et al. | 713/165 |
| 2008/0189539 A1* | 8/2008 | Hsu | 713/2 |
| 2010/0125723 A1* | 5/2010 | Cooper et al. | 713/1 |
| 2011/0162044 A1* | 6/2011 | Yamada et al. | 726/3 |
| 2012/0108205 A1 | 5/2012 | Schell et al. | |
| 2012/0226895 A1* | 9/2012 | Anderson et al. | 713/2 |

OTHER PUBLICATIONS

NFC World, "Inside Secure to offer cloud-based NFC secure element solution", http://www.nfcworld.com/2012/09/25/318059/inside-secure-to-offer-cloud-based-nfc-secu..., Jul. 23, 2013, 4 pages.
International Search Report and Written Opinion for International Patent Application No. PCT/US2013/045993, mailed on Aug. 30, 2013, 10 pages.
Ashutosh Dutta et al., "Media-Independent Pre-Authentication Supporting Secure Interdomain Handover Optimization", IEEE Wireless Communications, Apr. 2008, pp. 55-64.

* cited by examiner

*Primary Examiner* — Peter Shaw
(74) *Attorney, Agent, or Firm* — Kilpatrick Townsend & Stockton LLP

(57) ABSTRACT

Systems, methods, apparatuses, and computer-readable media are described for securely installing, executing and/or migrating a security sensitive application in a trusted execution environment on a mobile device. For example, techniques described herein allow a mobile device to verify the operating environment of the mobile device, the security sensitive application itself and discover a trusted execution environment on the device to install the security sensitive application. Furthermore, techniques are disclosed for verifying the state of one or more applications on the mobile device against a synchronized copy of the trusted execution environment operating in the cloud and also migrating the state of one or more applications from a trusted execution environment from a first mobile device to a second mobile device in the event that the mobile device is compromised, lost, stolen or being upgraded.

20 Claims, 17 Drawing Sheets

METHOD AND APPARATUS FOR SECURE APPLICATION EXECUTION

CROSS-REFERENCES TO RELATED APPLICATIONS

This application is a continuation application and claims the benefit of priority of U.S. Non-provisional application Ser. No. 13/917,546, filed Jun. 13, 2013, which is herein incorporated by reference in their entirety for all purposes.

BACKGROUND

Aspects of the disclosure relate to computing technologies. In particular, aspects of the disclosure relate to mobile computing device technologies, such as systems, methods, apparatuses, and computer-readable media for providing a trusted execution environment on a mobile device.

Mobile devices are becoming increasing prevalent. And consumers are using mobile devices for accessing the internet and services through applications and performing more and more complex tasks. Consumers are also relying on mobile devices with sensitive data such as Personal Identifiable Information (for example, birth dates, social security numbers, etc.) and Personal Account Information (for example, credit card numbers, account numbers, passwords, etc.), along with secure transactions such as accessing bank accounts or making payments. With the popularity of mobile devices, the mobile devices and the applications installed on the mobile device that are used to connect with the secure servers that have user sensitive information are falling prey to computer viruses and attacks that may comprise the integrity of the device and the applications while putting user sensitive data and secure transactions at risk.

Embodiments of the invention address these and other problems.

BRIEF SUMMARY

Systems, methods, apparatuses, and computer-readable media are described for securely installing, executing and migrating a security sensitive application in a trusted execution environment on a mobile device. For example, techniques described herein allow a mobile device to verify the operating environment of the mobile device, the security sensitive application itself and discover a trusted execution environment on the device to install the security sensitive application.

Furthermore, techniques are disclosed for verifying the state of one or more applications or a trusted execution environment in the mobile device against a synchronized copy of the trusted execution environment operating in the cloud and also migrating the state of one or more applications from a trusted execution environment or the trusted execution environment from a first mobile device to a second mobile device in the event that the mobile device is compromised, lost, stolen or being upgraded.

An example of a method for installing an application for secure execution on a mobile device may include authenticating, by the mobile device, at least one portion of an operating system, authenticating, by the mobile device, an application module, wherein the application module comprises an application loader and the application, discovering, using the application loader, mobile device support for one or more trusted execution environments, and installing, at the mobile device, the application in at least one trusted execution environment from the one or more trusted execution environments using the application loader.

An example mobile device may include a processor, and a computer readable medium coupled to the processor, the computer readable medium comprising code, executable by the processor for implementing a method that may include receiving an application module, wherein the application module comprises an application loader and an application and wherein the application loader comprises code for initiating authentication of at least a portion of an operating system, discovering mobile device support for one or more trusted execution environments, and installing, at the computing device, the application in at least one trusted execution environment from the one or more trusted execution environments.

In another example of a method may include establishing a secure communication channel between a first trusted execution environment executing on a server computer and a second trusted execution environment executing on a first mobile device, comparing a first state associated with the first trusted execution environment and a second state associated with the second trusted execution environment using the secure communication channel, and detecting a difference in the first state associated with the first trusted execution environment and the second state associated with the second trusted execution environment.

An example server computer may include a processor and a computer readable medium coupled to the processor, the computer readable medium comprising code, executable by the processor for implementing a method that may include establishing a secure communication channel between a first trusted execution environment executing on a server computer and a second trusted execution environment executing on a first mobile device, comparing a first state associated with the first trusted execution environment and a second state associated with the second trusted execution environment using the secure communication channel, and detecting a difference in the first state associated with the first trusted execution environment and the second state associated with the second trusted execution environment.

The foregoing has outlined rather broadly the features and technical advantages of examples according to the disclosure in order for the detailed description that follows to be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Figure 1:
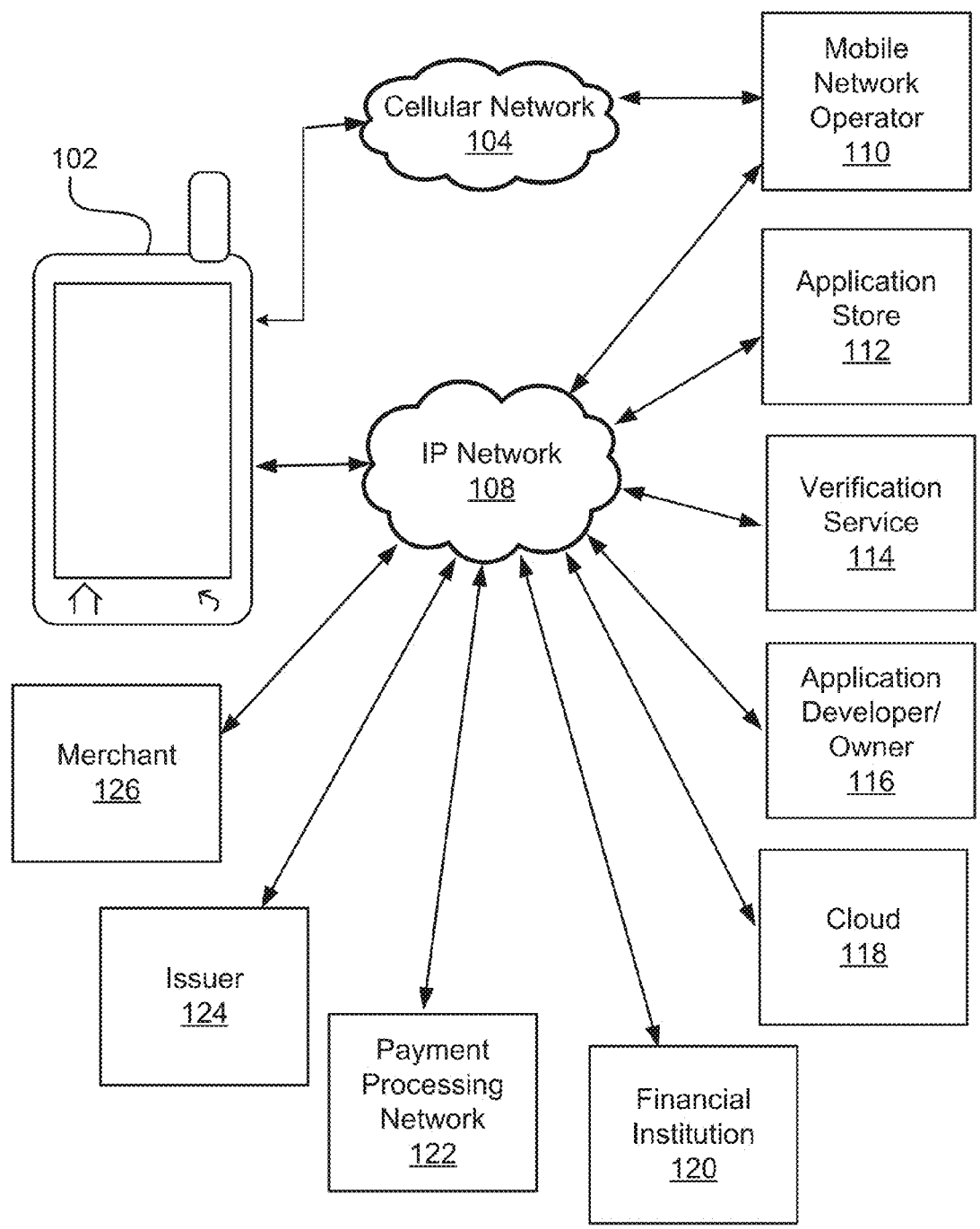
FIG. 1 illustrates an exemplary system with at least some of the entities in communication with the mobile device accordance with embodiments of the invention.

Systems, methods, apparatuses, and computer-readable media are described for securely installing, executing and migrating a security sensitive application in a trusted execution environment on a mobile device. For example, techniques described herein allow a mobile device to verify the operating environment of the mobile device, the security sensitive application itself and discover a trusted execution environment on the device to install the security sensitive application.

Furthermore, techniques are disclosed for verifying the state of one or more applications in the mobile device against a synchronized or near synchronized copy of the trusted execution environment operating in the cloud and also migrating the state of one or more applications from a trusted execution environment from a first mobile device to a second mobile device in the event that the mobile device is compromised, lost, stolen or is being upgraded.

Implementing the techniques described herein are advantageous for protecting the user sensitive data as the mobile devices are becoming increasing prevalent. Consumers are using these devices for accessing services through the internet using applications and relying on mobile devices with sensitive data such as Personal Identifiable Information (for example, birth dates, social security numbers, etc.) and Personal Account Information (for example, credit card numbers, account numbers, passwords, etc.), along with secure transactions such as accessing bank accounts or making payments. With the popularity of mobile devices, the mobile devices and the applications installed on the mobile device that are used to connect with the secure servers that have user sensitive information are falling prey to computer viruses and attacks that may comprise the integrity of the device and the applications while putting user sensitive data and secure transactions at risk.

Current solutions are inadequate, at best, in providing security over a wide variety of mobile devices with varying hardware and software support for security technologies. For example, some mobile devices implement a secure element that provides a trusted execution environment for the storage of valuable data and the execution of security sensitive applications. However, implementing a secure element may be expensive, in terms of actual silicon cost, implementation complexity and higher power envelope, and may also be limited in the amount of memory and processing power available. Therefore, many mobile device manufacturers may not implement a secure element.

In the absence of a secure element on the mobile device, the security sensitive applications either install and execute on the operating system without any protection of a trusted execution environment or not install on the mobile device at all. Embodiments of the invention disclose a method for discovering the various trusted execution environments supported by a mobile device and select the most appropriate environment for installation of the application.

Furthermore, current implementations provide very little support for detecting a compromised trusted execution environment and protecting the secure data stored on a lost, stolen or Jail-broken mobile device. Also, current solutions do not provide a robust mechanism for migrating secure user data in the event that the mobile device is compromised, lost, stolen or is being upgraded. Embodiments of the invention disclose a method for dynamically detecting discrepancies in the execution of applications in the trusted execution environment on the mobile device by checking the state of the trusted execution environment on the device with a synchronized instance of the trusted execution environment executing on a secure server in the cloud. The uncompromised instance of the trusted execution environment executing in the cloud can also be used for migrating the trusted execution environment from one device to another.

Prior to discussing embodiments of the invention, description of some terms may be helpful in understanding embodiments of the invention.

As discussed herein, a "mobile device" may comprise any electronic device that may be transported and operated by a user, which may also provide remote communication capabilities to a network. The mobile device may be configured to receive alert messages from a server computer and display the alert message on a display screen in the mobile device. Examples of mobile devices include mobile phones (e.g. cellular phones), PDAs, tablet computers, net books, laptop computers, personal music players, hand-held specialized readers, etc.

A "server computer" may typically be a powerful computer or cluster of computers. For example, the server computer can be a large mainframe, a minicomputer cluster, or a group of servers functioning as a unit. In one example, the server computer may be a database server coupled to a web server.

A "user" may be an entity, such as, an individual that may be associated with one or more payment accounts and/or mobile devices. The user may be able to download a security sensitive application, such as a payment application and initiate installation of the application on the mobile device. Furthermore, through a user interface provided by the device, the user may be capable of selecting a secure installation option for installation of the security sensitive application.

A "trusted execution environment" (TEE) may be a secure environment on the computing device for securely executing an application. A trusted execution environment may be supported in software, hardware, firmware or a combination thereof. The trusted execution environment may be implemented so that its execution and data space are isolated from other environments executing code on the computing device. For example, the trusted execution environment may have dedicated or protected processing and system resources, such as secure storage and protected memory buffers. In some implementations, a trusted execution environment may have paging structures, exception handlers, protected memory regions and hardware resources dedicated or associated with the trusted execution environment. A trusted execution environment is not limited to but may be implemented using one or more trusted execution environments that may include a secure element, SIM/UICC card, or virtualization technology.

A "cryptographic measurement" may be generated from a sequence of bits, such as a message or software using well-known one way hash functions, resulting in a cryptographic string. Examples of such cryptographic functions include, but are not limited to SHA-1 (Secure Hash Algorithm-1) and SHA-256 (Secure Hash Algorithm-256). A "cryptographic measurement" uniquely identifies the sequence of bits using the cryptographic string so that no other cryptographic string may represent the same sequence of bits. The cryptographic measurement of a sequence of bits may be used to authenticate the integrity of the sequence of bits (i.e., the sequence of bits have not been tampered with). For example, a cryptographic measurement of an operating system may be checked against a stored value from a protected location to determine that the operating system has not been modified from its expected state.

"Authentication" may be the process of proving or verifying certain information. As referred to herein, authenticating comprises generating a cryptographic measurement of a software entity, such as an operating system or an application, and verifying the authenticity of the application against a stored value.

An "operating system" (OS) may be a collection of software that manages computer hardware resources and provides common services for applications. The operating system is a vital component of the system software in a computer system. Applications usually require an operating system to function.

A "network stack" may be an implementation of a networking protocol used for communicating between any two devices. In some implementations, the operating system implements one or more network stacks for communicating with a network, wherein the network comprises of one or more computing devices. An example of a networking protocol is the open standards interface (OSI) networking protocol. A network stack may be capable of communicating over a variety of wired and wireless protocols, such as Ethernet, 3GPP, 3GPP2, CDMA, LTE, Bluetooth, NFC, etc.

A "security sensitive application" may include any application executing on a device that manages sensitive data associated with the user, such as a payment account. Sensitive data may include sensitive information, such as Personal Account Information (PAI) and Personal Identifying Information (PII). Examples of PAI data may include account numbers, such as Personal Account Numbers (PAN) associated with a payment device. Example of PII data may include social security numbers, names, birth dates, etc.

A "secure communication channel" may be a networking channel between two entities, such as a server computer and mobile device, that may allow the two entities to communicate with each other through a secure channel without eves dropping by a third entity, spoofing of the communication by a third entity or masquerading of the third entity as one of the two expected entities participating in the secure communication. Setting up a secure communication channel allows sensitive information such as credit card numbers, social security numbers, login credentials and signaling information for managing the trusted execution environment to be transmitted securely between the two entities. Known techniques, such as secure socket layer (SSL) protocols may be used in establishing a secure communication channel.

A "secure element" is an example of a trusted execution environment. A secure element securely store applications and/or credentials (e.g., financial account numbers) and provide for secure execution of applications. The secure element may comprise secure memory and execution environment that is a dynamic environment to securely store application code and data and administer the secure execution of applications. The secure element may comprise computing logic, such as a 8-32 bit CISC/RISC processor, a crypto processor for encrypting, decrypting and signing data packets using security algorithms such as AES, DES, ECC, a random number generator, ROM, RAM, EEPROM/Flash, a communication interface and a Memory Management unit. The secure element may also provide delimited memory for each application.

"Virtualization technology" may be used for providing isolation between different operating environments sharing the same physical resources. In other words, virtualization provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM.

A "subscriber identity/identification module" (SIM) is an example of a trusted execution environment. The SIM is commonly used to securely store the international mobile subscriber identity (IMSI) and the related key used to identify and authenticate subscribers on mobile devices. A SIM circuit is embedded into a removable plastic card. This plastic card is called "SIM card" and can be transferred between different mobile devices. A SIM card is an example of a trusted execution environment, however, other variations of a SIM card, such as a universal integrate circuit card (UICC) may be interchangeably used herein, without departing from the scope of the invention.

"Roots of trust" (RoT) are hardware/software components for performing security-critical functions, such as measuring/verifying software, protecting cryptographic keys and performing device authentication. The root of trust is ideally implemented in hardware or protected by hardware and is inherently trusted. The root of trust may also present an immutable uniqueness or identity for the computing device via a hash of a public key associated with a trusted entity, embedded in secure fuses and accessible by the processor in a secure manner. In exemplary implementations, option ROMs or secure fuses may be used for implementing a root of trust on a device.

An application module may facilitate the secure installation of the security sensitive application on the mobile device. The application module may be downloaded by a user on the mobile device. The application module may include an application loader and the security sensitive application. The application module may also include a Virtual Machine Monitor (VMM) installer. The application loader securely installs the security sensitive application from the application module onto the mobile device.

"Cloud computing" or "Cloud" may refer to use of computing resources (hardware and/or software) which are available in a remote location and accessible using network resources. Hardware and software resource may include, but are not limited to, one or more server computers, databases, routers, operating system and applications. In some implementations, users are able to buy/loan these computing resources (including storage and computing power) as a utility, on demand.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. In some implementations, the payment processing network may interact with applications running on a user device. The payment processing network may include a server computer. The payment processing network may use any suitable wired or wireless network, including the Internet.

As used herein, an "issuer" may typically refer to a business entity (e.g., a bank) that maintains financial accounts for the user and often issues a payment device, such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchants and issuers may comprise one or more computer apparatuses to enable communications through the communications network, or to perform one or more of the functions described herein.

A "mobile operating network" may be a radio network distributed over land areas called cells, each served by at least one fixed-location transceiver, known as a cell site or base station. When joined together these cells may provide radio coverage over a wide geographic area. This enables a large number of mobile devices to communicate with each other and with fixed devices anywhere in the network, via base stations.

FIG. 1 illustrates an exemplary system with at least some of the entities in communication with the mobile device 102 in accordance with embodiments of the invention. A user of a mobile device 102 downloads applications and installs those applications on their mobile device 102. The user of the mobile device 102 may communicate with one or more entities in the process of downloading and installing applications.

The user may communicate with the Mobile Network Operator 110 through a cellular network 104 using well-known wireless communication protocols, such as CDMA, GSM, 3GPP, 3GPP2, LTE or any other suitable communication protocol. A cellular network 104 may comprise of one or more base stations (not shown) and communication routing centers (not shown) for communicating between the mobile device 102 and the Mobile Network Operator 110. In one implementation, for data communication, the Mobile Network Operator 110 may route the communication to an IP Network 108. For example, a mobile device 102 user may be able to access internet service, such as accessing certain webpages or interacting with servers through installed application on the mobile device 102, through the Mobile Network Operator 110.

The mobile device 102 may also directly access the IP Network 108. For example, the user may connect to the IP Network 108 through a WiFi (802.11) connection. Once the mobile device 102 is connected to the IP Network 108 the mobile device 102 may connect and communicate with one or more entities. For example, the user may connect with the Mobile Network Operator 110 using their mobile device 102 to manage their phone and data usage.

In the regular course of usage, the mobile device 102 may interact with many entities for managing accounts, making payments, or a variety of other tasks that may involve accessing, updating and transmitting user sensitive information. For example, the user may make a payment at a point of sale terminal or online with a Merchant 126 and in the process share credit card information with the Merchant 126. The user may manage their online credit card accounts with the credit card issuer 124 or may connect to the Payment Processing Network 122 to manage and authorize transactions. The user may also connect to a financial institution, through their mobile device 102, for managing bank accounts or mortgage accounts 120.

In accessing some of the services mentioned above, the user may download and install applications that connects with one or more entities and accesses, updates, stores and transmits user sensitive information. The user may download the applications from the financial institutions directly, find the applications on an online application store 112, such as the Apple® or Google® application stores, directly download the application from the developer of the application 116 or download the application from a third party vendor or an internet website.

Some applications, such as games, calculators, or other tools do not directly interface with user sensitive information and running such applications on a compromised device or downloading a corrupted or hacked version of the application may not expose additional user sensitive data. However, many of the applications discussed above may directly interface with user sensitive information, and exposing such information through a compromised mobile device 102 or a hacked version of the application may be detrimental to the user's interests.

Embodiments of the invention, as discussed below describe techniques for securely installing and executing an application. In one implementation of the invention, the mobile device 102 verifies the integrity and authenticity. The verification may be provided by the application developer, owner or a third trusted party, such as the verification service 114 or the payment processing network 122. Furthermore, as discussed in further detail, the mobile device 102 may use a cloud 118 based service to maintain and verify the execution state of the application.

Figure 2:
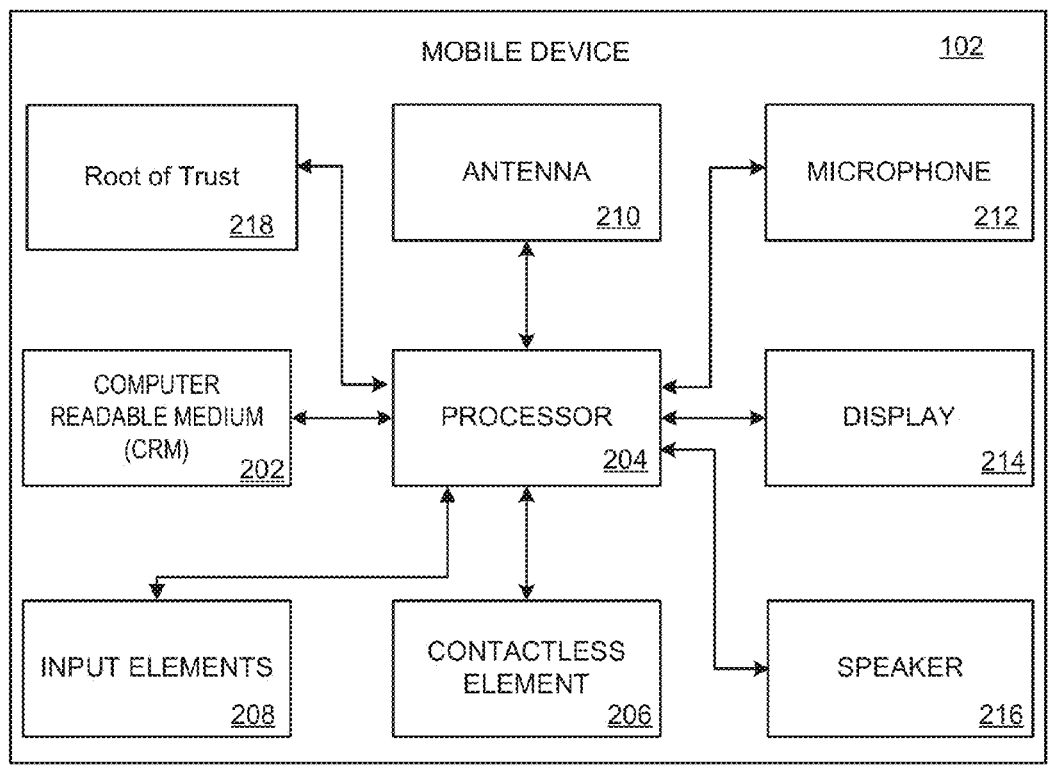
FIG. 2 illustrates at least some of the elements of an exemplary mobile device in accordance with embodiments of the invention.

FIG. 2 illustrates at least some of the elements of an exemplary mobile device 102 in accordance with embodiments of the invention. The mobile device 102 may comprise a computer readable medium 202, an antenna 210, a microphone 212, a display 214, a speaker 216, a contactless element 206, and input elements 206, a root of trust 218 module and these may all be operatively coupled to a processor 204.

The mobile device 102 may be a payment device that may be used to make payments, conduct a transaction, a communication device to allow a user to log on to a website and download an application, etc. The exemplary mobile device 102 may comprise a computer readable medium (CRM) 202 comprising code executable by the processor 204 for implementing methods using embodiments of the invention. The computer readable medium 202 may be in the form of a memory that stores data and could be internal to the device or hosted remotely (i.e., cloud) and accessed wirelessly by the device. A contactless element 206 may be capable of transmitting and receiving wireless data or instructions using a short range wireless communications capability.

The mobile device 102 may be a mobile phone, a tablet, a PDA, a laptop or any such electronic device capable of communicating and transferring data or control instructions via a wireless network (e.g., cellular network, internet, etc.) and short range communications. The mobile device 102 may include the processor 204 (e.g., a microprocessor) for processing the functions of a mobile device 102 (e.g., a phone) and a display 214 to allow a user to see messages (e.g., alert messages), phone numbers, images, and other information. The mobile device 102 may further include input elements 208 to allow the user to input information into the device (e.g., using a keypad, touch screen, mouse, etc.), a speaker 216 to allow the user hear voice communication, music, etc., and a microphone 212 to allow the user transmit her voice through the device. The mobile device 102 may also include an antenna 202 for wireless data transfer.

In some embodiments, the mobile device 102 may allow the user to communicate with one or more entities, such as the entities described in FIG. 1. The mobile device 102 may also allow the user to download and install security sensitive applications on the mobile device 102.

Figure 3:
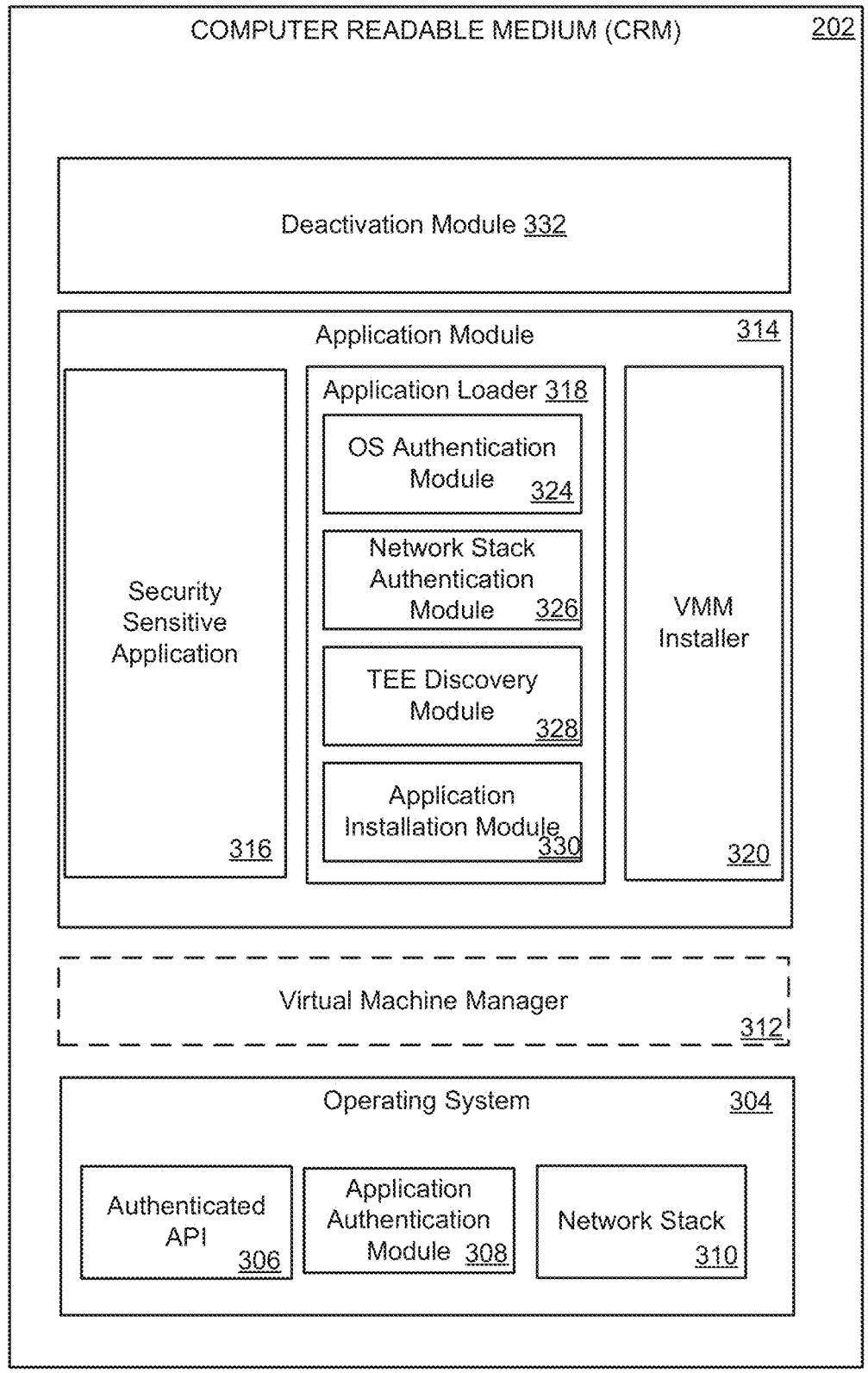
FIG. 3 shows an exemplary computer readable medium for the mobile device discussed in FIG. 2, in accordance with some embodiments.

FIG. 3 shows an exemplary computer readable medium in accordance with some embodiments of the invention. The computer readable medium (CRM) 202 may comprise code, executable by the processor 204 for implementing methods using embodiments of the invention. The computer readable medium 202 may comprise the operating system 304, the application module 314 and optionally the virtual machine monitor (VMM) 312 and deactivation module 332.

The operating system 304, besides other software modules may also include a network stack 310, an application authentication module 308 and an authenticated API module 306. The network stack 310 provides the operating system 304 a means for communicating with one or more entities described in FIG. 1, over a network. The application authentication module 308 may authenticate the integrity of the security sensitive application before the application is installed, according to embodiments of the invention. The authenticated API 306 provides the application with an interface to initiate the authentication process. In one implementation, invoking the authenticated API 306 causes the authenticated API 306 to access the Root of Trust 218 for the authentication of the operating system.

The application module 314 may be downloaded by a user on the mobile device 102 and may facilitate the secure installation of the security sensitive application on the mobile device 102. The application module 314 may include an application loader 318 and the security sensitive application 316 itself. The application module may also include a VMM installer 320.

The application loader 318 securely installs the security sensitive application 316 from the application module 314 onto the mobile device 102. In one implementation, the application loader 318 may further comprise an OS authentication module 324, network stack authentication module 326, TEE discovery module 328 and application installation module 330.

The OS authentication module 324 authenticates the operating system 304 or at least crucial portions of the operating system 304 executing on the mobile device 102. For example, the OS authentication module 324 may authenticate the kernel of the operating system 304.

The network stack authentication module 326 initiates authentication of the network stack 310, so that the mobile device 102 can securely communicate with a trusted entity by creating a secure communication channel.

The trusted execution environment (TEE) discovery module 328 discovers the security capabilities of the mobile device 102 for supporting one or more trusted execution environments. The TEE discovery module 328 may use hardware and software hooks on the mobile device 102 to determine the security capabilities on the mobile device 102. For example, the TEE discovery module 328 may determine that the mobile device 102 has support for a secure element, a SIM card or virtualization technology that can be used for implementing the trusted execution environment.

The application installation module 330 unwraps the security sensitive application 316 from the application module 314 and install the application in the trusted execution environment. In some implementations, depending on the trusted execution environment discovered the application installation module 330 may prepare the trusted execution environment before installing the security sensitive application 316 in the trusted execution environment.

In some variations of the embodiments, the application module 314 may also have a VMM installer module 320. The VMM installer module 320 may be invoked by the TEE discovery module 328, once the application loader 318 determines that the mobile device 102 supports virtualization technology and determines that the application should be installed in a secure container hosted by a VMM. The VMM installer module 320 installs the VMM on the mobile device 102. The VMM creates a secure container for the installation and execution of the security sensitive application 316.

In some aspects of the invention, the Virtual Machine Monitor 312 may already be installed on the mobile device 102. If the VMM is already installed on the mobile device 102, in one implementation, the TEE discovery module 328 may transfer control to the application installation module 330 for the installation of the application, instead of transferring control to the VMM installer module 320.

I. Installation of a Security Sensitive Application

Figure 4:
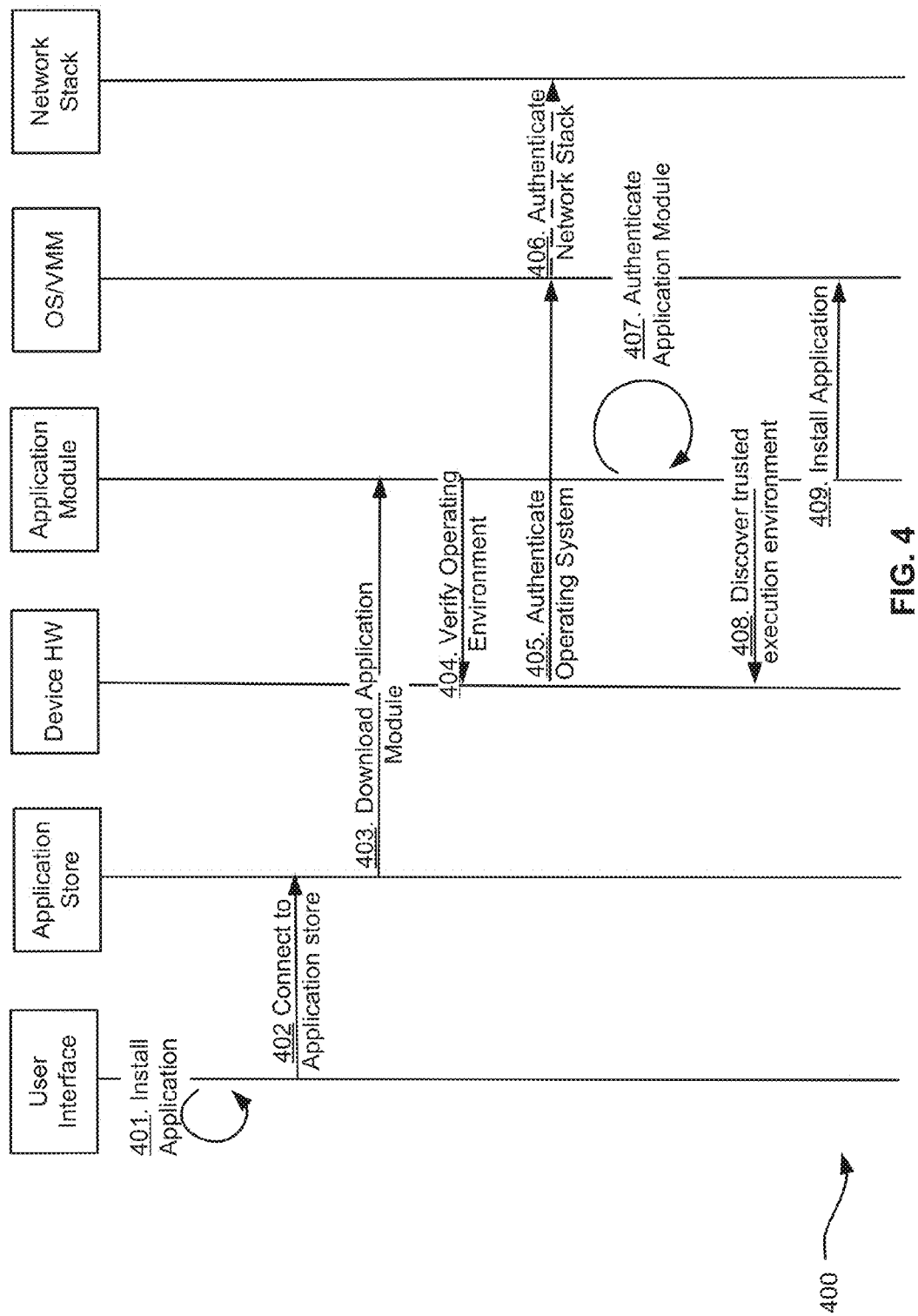
FIG. 4 illustrates an exemplary flow diagram for installation of an application according to embodiments of the invention.

FIG. 4 illustrates an exemplary flow diagram for installation of the application according to embodiments of the invention. The method 400 is performed by processing logic that comprises hardware (circuitry, dedicated logic, etc.), software (such as is run on a general purpose computing system or a dedicated machine), firmware (embedded software), or any combination thereof. In one embodiment, the method 400 is performed by device 102 of FIG. 2.

At step 401, the user interacts with a user interface provided by the mobile device 102 to install an application.

At step 402, the user may connect to an application store and browse for an application at the application store. For example, an application store, such as an Apple® or a Google® application store, may present the user with numerous applications that include both security sensitive applications and security agnostic applications. In some instances, the application selected by the user of the mobile device 102 may be a security sensitive application 316. A security sensitive application 316 may include an application that manages sensitive information, such as Personal Account Information (PAI) and Personal Identifying Information (PII). Examples of PAI data may include account numbers, such as Personal Account Numbers (PAN) associated with a payment device. Examples of PII data may include social security numbers, names, birth dates, etc.

At step 403, once the user selects the application to download, the mobile device 102 downloads the application (403). At step 403, in one implementation, according to embodiments of the invention, downloading a security sensitive application 316 may result in downloading an application module 314 that includes the security sensitive application 316. The application module 314 includes at least an application loader 318 and the security sensitive application 318.

Figure 5:
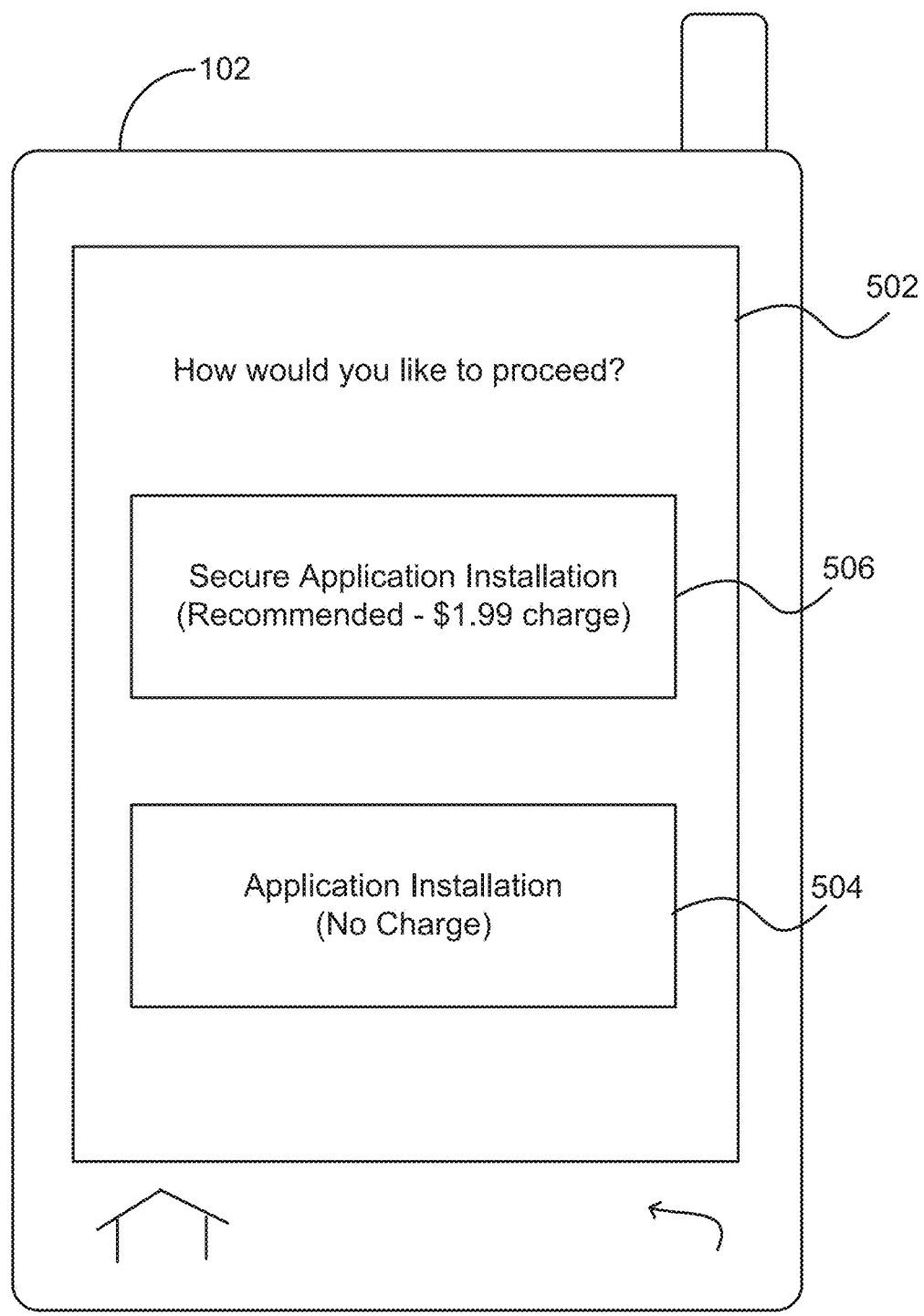
FIG. 5 illustrates an exemplary mobile device for installation of an application according to embodiments of the invention.

Before proceeding with the installation, in one implementation, the user interface shown in FIG. 5 may provide the user with the option of proceeding with the secure installation of the application or installing a non-secure version of the application. In FIG. 5, the interface shown on the display of the mobile device 102 provides the user with an exemplary user interface for proceeding with a secure application installation (506) or normal application installation (507). In some implementations, the secure application installation may have a small fee associated with the installation, whereas the normal application installation may be cheaper than the secure application installation or free, therefore providing a cost differentiation between a secure and unsecure installation of a security sensitive application.

At step 404, the application loader 318 from the application module 314 initiates the process of verifying aspects of the mobile device 102 related to the operating environment and secure execution of the application. For example, the application loader may verify that that the device is not tampered with (i.e., jail broken) or that the crucial components of the operating system have not been modified or hacked. The application loader 318 is responsible for authenticating the destination environment of the application and securely installing the security sensitive application on the mobile device 102. In one implementation, the application loader 318 may further comprise an OS authentication module 324, network stack authentication module 326, TEE discovery module 328 and application installation module 330.

At step 405, the OS authentication module 324 from the application loader 318 may initiate an authenticated Application Programing Interface (API) 306 to perform authentication of at least a portion of the operating system 304. Authenticating at least one portion of the operating system 304 may include performing a cryptographic measurement of the at least one portion of the operating system 304 and comparing the cryptographic measurement against a stored value on the mobile device 102. The term "cryptographic measurement" may be used as a "digital signature" in some instances, as discussed herein. A digital signature is a mathematical scheme for demonstrating the authenticity of a digital message or document. A valid digital signature gives the verifier a reason to believe that the content was created by a known creator, such that the creator cannot deny having generated the message and that the message was not altered. Other known techniques for generating a digital signature may be used in place of or along with creating a cryptographic measurement without departing from the scope of the invention.

The cryptographic measurement of the operating system or portions of the operating system may be stored in a secure storage on the mobile device 102, such as a root of trust. In one simplistic and exemplary implementation, the root of trust is a hash of a public key associated with a trusted entity, embedded in secure fuses or option ROM (Read Only Memory) and accessible by the processor in a secure manner.

At step 406, the network stack 310 may also be authenticated. Authenticating the network stack 310 may facilitate creating a secure communication channel between the operating system 304 and one or more trusted entities. In one implementation, the network stack 310 is authenticated as part of authenticating one of the portions of the operating system 304, in Step 405.

At step 407, the application module 314 is authenticated by the application authentication module 308 from the operating system 304. Authenticating the application module 314 comprises performing a cryptographic measurement of the application module 314 and comparing the cryptographic measurement against a value retrieved from an at least one trusted entity using the secure communication channel. The secure communication channel may be created using the authenticated network stack 310 from step 406. The at least one trusted entity may be one or more of an application developer/owner 116, an application store 112, a mobile operating network 110, a payment processing network 122, an issuer 124, or a merchant 126.

Performing a two way authentication as described above, where the application module 314 establishes trust in the operating environment of the mobile device 102 and the mobile device 102 establishes trust in the integrity of the application itself, is advantageous in protecting the sensitive information about the user.

For example, if the mobile device 102 or the operating system 304 installed on the mobile device 102 is compromised, installing a security sensitive application 316, such as a payment application on the mobile device 102 would expose sensitive user information from the payment application to theft or misuse. Therefore, if the application loader 318 discovers that crucial components of the operating system 304 are compromised, the application loader 318 may deny/abort installation of the security sensitive application 316 on the mobile device 102.

Similarly, if the application module 314 downloaded is either tampered or is malicious it can expose sensitive user information on the mobile device 102 or information entered by the user through the user interface by masquerading as a legitimate application approved by the vendor and gaining access to sensitive user information. Furthermore, installing a malicious application module 314 on the mobile device 302 can also compromise the device and expose any other sensitive information already stored on the mobile device 102.

Therefore the two way authentication described above protects sensitive user information by ensuring that both the operating environment and the application module 314 are not malicious before proceeding with the installation of the application.

At step 408, once the operating environment is verified and the application module 314 is authenticated, the TEE discovery module 328 of the application loader 318 discovers one or more trusted execution environments associated with the device. The TEE discovery module 328 may query the system hardware and software for discovering the various trusted execution environments supported by the mobile device 102. Examples of trusted execution environments may include a secure element, a SIM card, or a secure virtual machine created using virtualization technology. Creation of a trusted execution environment using virtualization technology is discussed in more detail in FIG. 7.

It is advantageous to discover the various trusted execution environments supported by a mobile device and select the most appropriate environment for installation of the application. This allows flexibility in implementing security over a wide variety of mobile devices with varying hardware and software support for security technologies. For example, some mobile devices implement a secure element that provides a trusted execution environment, however, other mobile devices do not implement a secure element due to the cost or design considerations involved. In such devices that do not have a secure element, the mobile device 102 may still be able to allow acceptable level of security using a SIM card, or creating a trusted execution environment using virtualization technology (as discussed in FIG. 7) or using any other suitable means.

At step 409, the application installation module 330 may install the security sensitive application 316 in one of the trusted execution environments discovered and prepared by the application loader 318.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 400.

Figure 6:
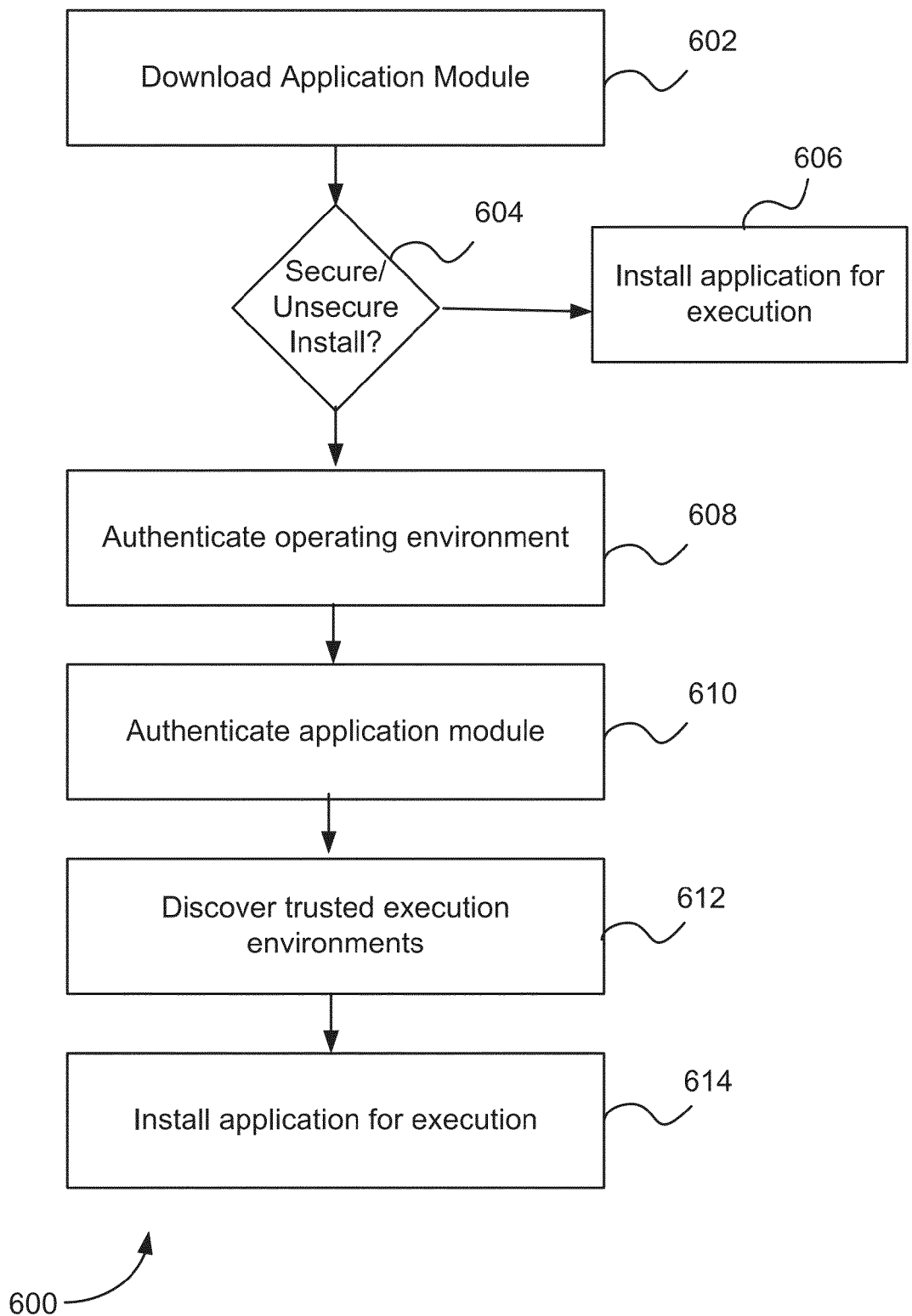
FIG. 6 illustrates another exemplary flow diagram for installation of an application according to embodiments of the invention.

FIG. 6 illustrates an exemplary flow diagram for installation of the application according to embodiments of the invention. The method 600 is performed by processing logic that comprises hardware (circuitry, dedicated logic, etc.), software (such as is run on a general purpose computing system or a dedicated machine), firmware (embedded software), or any combination thereof. In one embodiment, the method 600 is performed by device 102 of FIG. 2.

At step 602, the mobile device 102 downloads the application module 314. The application module 314 includes at least the application loader 318 and the security sensitive application 316. The application loader 314 is responsible for verifying the state of the destination environment of the application installation and securely installing the security sensitive application 316 on the mobile device 102.

At step 604, the application module 314 may invoke a user interface, as shown in FIG. 5, to request user input on whether the user would like to perform a secure installation or not. If the user does not select a secure installation, then at Step 606, the application may be installed outside the boundary of a trusted execution environment. However, if the user selects secure installation of the application, the mobile device 102 proceeds with secure installation of the application at Step 608 by performing a two way authentication. In the two way authentication, the application module 314 verifies the state of the operating environment before allowing installation of the application 316 and the operating environment authenticates that the application module 314 is un-tampered and originates from a trusted source.

At step 608, components of the mobile device 102 authenticate at least one portion of an operating system 304. For example, the OS authentication module 324 from the application loader 318 may initiate the authentication of the at least one portion of the operating system 304. Authenticating at least one portion of the operating system 304 may include performing a cryptographic measurement of the at least one portion of the operating system 304, and comparing the cryptographic measurement against a stored value on the mobile device 102.

At step 610, components of the mobile device, such as the application authentication module 308 from the operating system 304, authenticates the application module 314. Authenticating the application may include performing a cryptographic measurement of the application module 314, and comparing the cryptographic measurement against a value retrieved from an at least one trusted entity using a secure communication channel. The value may be received from the trusted entity using a secure communication channel, wherein the secure communication channel may be created between the device and the trusted entity using an authenticated network stack, and wherein the network stack is authenticated as part of authenticating the at least one portion of the operating system. The at least one trusted entity is one or more of a mobile operating network, a payment processing network, an issuer, a financial institution or a merchant.

At step 612, components of the mobile device 102, such as the TEE discovery module 328 from the application loader 318, may discover mobile device 102 support for one or more trusted execution environments. The support for one or more trusted execution environments may include a secure element, SIM/UICC card, or virtualization.

At step 614, components of the mobile device 102, such as the application installation module 330 from the application loader 318, may install the application in the at least one trusted execution environment using the application loader 318. In one implementation, installing the application may include creating a secure container within an authenticated operating environment, wherein the operating environment manages a plurality of hardware resources for the secure container and installing the application within the secure container. In one aspect, the secure container may be a virtual machine and the authenticated operating environment may be a virtual machine monitor.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

An example mobile device 102 may include a processor 204 and a computer readable medium 202 coupled to the processor 204, the computer readable medium 202 comprising code, executable by the processor 204 for implementing a method that may include receiving an application module 314, wherein the application module 314 may include an application loader 318 and an application 316 and wherein the application loader 318 includes instructions for initiating authentication of at least a portion of an operating system 304, discovering mobile device support for one or more trusted execution environments and installing, at the mobile device, the application in at least one trusted execution environment from the one or more trusted execution environments.

In some aspects of the implementation of the mobile device 102, the application loader 318 from the application module 314 initiates the authentication of the at least one portion of the operating system 304. The authentication of the at least one portion of the operating system 304 may be initiated in response to a request to install the application 316.

In one implementation, authenticating the at least one portion of the operating system 304 may include performing a cryptographic measurement of the at least one portion of the operating system, and comparing the cryptographic measurement against a stored value on the mobile device 102. Similarly, authenticating the application module 314 may include performing a cryptographic measurement of the application module 314, and comparing the cryptographic measurement against a value retrieved from an at least one trusted entity using a secure communication channel. The at least one trusted entity may include one or more of a mobile operating network 110, a payment processing network 122, an issuer 124, a financial institution 120 or a merchant 126. The value may be received from the trusted entity using a secure communication channel, wherein the secure communication channel may be generated between the mobile device 102 and the trusted entity using an authenticated network stack 310, and wherein the network stack 310 is authenticated as part of authenticating the at least one portion of the operating system 304. The application module 314 may be authenticated by the operating system 304.

In one implementation of the mobile device 102, installing the application 316 may include instructions for creating a secure container within an authenticated operating environment, wherein the operating environment manages a plurality of hardware resources for the secure container, and installing the application within the secure container. The secure container may be a virtual machine and the authenticated operating environment may be a virtual machine monitor 312.

II Virtualizing a Trusted Execution Environment:

Techniques described herein allow a computer system, such as a mobile device 102, to virtualize a trusted execution environment on a mobile device 102 in software or firmware. In an exemplary embodiment, a virtualized trusted execution environment is implemented using a secure/trusted container such as a trusted Virtual Machine.

Generally, embedding a secure element is desirable in mobile devices 102 to conduct secure transactions such as financial payments. Secure elements securely store applications and/or credentials (e.g., financial account numbers) and provide for secure execution of applications. The secure element may comprise secure memory and execution environment that is a dynamic environment to securely store application code and data and administer the secure execution of applications. The secure element may be implemented using a separate secure chip, such as a smart card chip, embedded in the mobile device 102 as a standalone chip or coupled with a Near Field Communication (NFC) chip. The secure element may also be implemented in a SIM/UICC card (which is used by GSM mobile phone operators to authenticate subscribers on their networks and maintain personalized subscriber information and applications), or in an SD card that can be inserted in the mobile device 102.

The secure element may comprise computing logic, such as a 8-32 bit CISC/RISC processor, a crypto processor for encrypting, decrypting and signing data packets using security algorithms such as AES, DES, ECC, a random number generator, ROM, RAM, EEPROM/Flash, a communication interface and a Memory Management unit. The secure element may also provide delimited memory for each application.

The trust and security provided by the secure element is a property of the isolated environment used for storing and executing the application and the associated data, coupled with the cryptographic functionality. Current implementations of the secure element are mostly limited to hardware and are severely constrained by the amount of memory and processing power available. Hardware implementations consume additional power, require more space in the mobile device 102 implementations, are expensive and provide very little support for migration of the information provisioned on the secure elements. If such isolation and cryptographic functionality can be provided in firmware or software layers, implementing and deploying secure element functionality would become much more cost effective and easier to deploy across a wider range of devices.

Embodiments of the invention described herein include techniques for virtualizing a trusted execution environment on a mobile device 102 in software or firmware. In an exemplary embodiment, a virtualized trusted execution environment is implemented using a secure/trusted container such as a trusted Virtual Machine using virtualization technology. Using virtualization technology to implement a trusted execution environment in software enables comparable security to a standalone implementation of the secure element in hardware due to the isolation properties provided by virtualization technology. In some embodiments, the virtualization technology is anchored in hardware, creating an even more robust implementation of a virtualized secure element. Intel® and AMD® processors provide hardware hooks that support virtualization technology. Qualcomm also provides a software abstraction layer which enables multiple operating systems and other clients to execute concurrently on a single processor, through the virtualization and portioning of physical hardware resources.

Virtualization technology provides isolation between different operating environments sharing the same physical resources. In other words, virtualization provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM.

FIGS. 7A-7F provide an exemplary graphical representation of a mobile device 102 using virtualization technology to create a secure container and install a security sensitive application 316 on a mobile device.

Figure 7A:
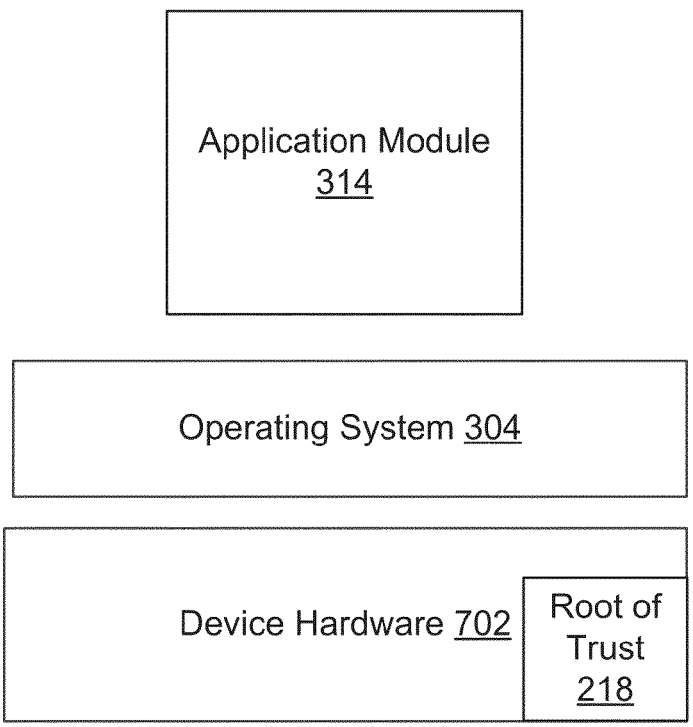
FIG. 7A-7F illustrate an exemplary mobile device and the steps for installation of the application using a secure container according to embodiments of the invention.

FIG. 7A depicts an exemplary mobile device 102 for implementing a virtualized trusted execution environment.

Figure 15:
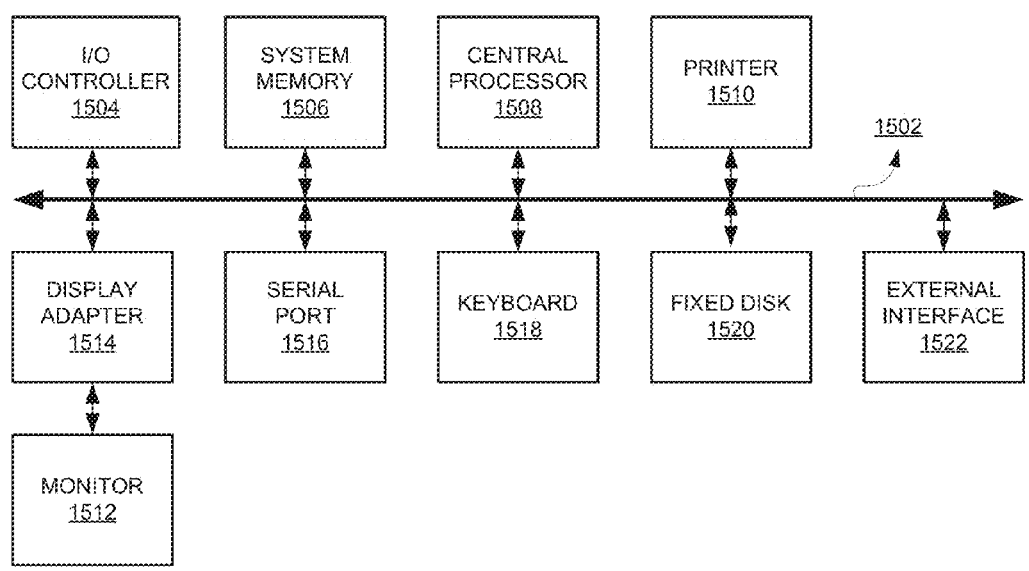
FIG. 15 is a high level block diagram of a computer system that may be used to implement any of the entities or components described herein.

The mobile device 102 has device hardware 602, comprising various hardware components, as discussed in in FIG. 2 and FIG. 15.

A virtualized trusted execution environment may be implemented using an isolated and secure container such as a Virtual Machine (VM) on a mobile device 102 with device hardware 702 that supports virtualization technology and may also be capable of generating random numbers, providing functionality for cryptographic operations, providing uniqueness and a root of trust 218.

The trust in the contents of the VM emanates from the root of trust 112. The root of trust 112 provides the foundation of trust for creating a virtualized secure element. The trust flows down the chain from the secure container until it reaches the root of trust 218. The root of trust may be analogized to a key guarding a house. The owner of the house has a certain level of trust that the contents of her/his house are safe as long as the owner has the key in her/his possession. The level of trust depends on various factors such as the sophistication (strength) of the key/lock system, the strength of the door, other openings and doors into the house (isolation properties), locality of the house and the contents safeguarded by the house. The root of trust may have varying strengths based on the platform both in terms of number of bits and protection. In one simplistic and exemplary implementation, the root of trust 218 is a hash of a public key associated with a trusted entity, embedded in secure fuses and accessible by the processor in a secure manner.

As shown in FIG. 7A, the mobile device 102 executes an operating system 304 on the device hardware 702. An operating system 304 may be a collection of software that manages computer hardware resources and provides common services for applications. The operating system 304 is a vital component of the system software on the mobile device 102.

The application module 314 is downloaded by the user from a remote server computer to the mobile device 102. As discussed previously, the application module 314 may include an application loader 318 and the security sensitive application 316. In one variation, the application module 314 may also include a VMM installer to facilitate creation of a trusted execution environment using virtualization technology.

Figure 7B:
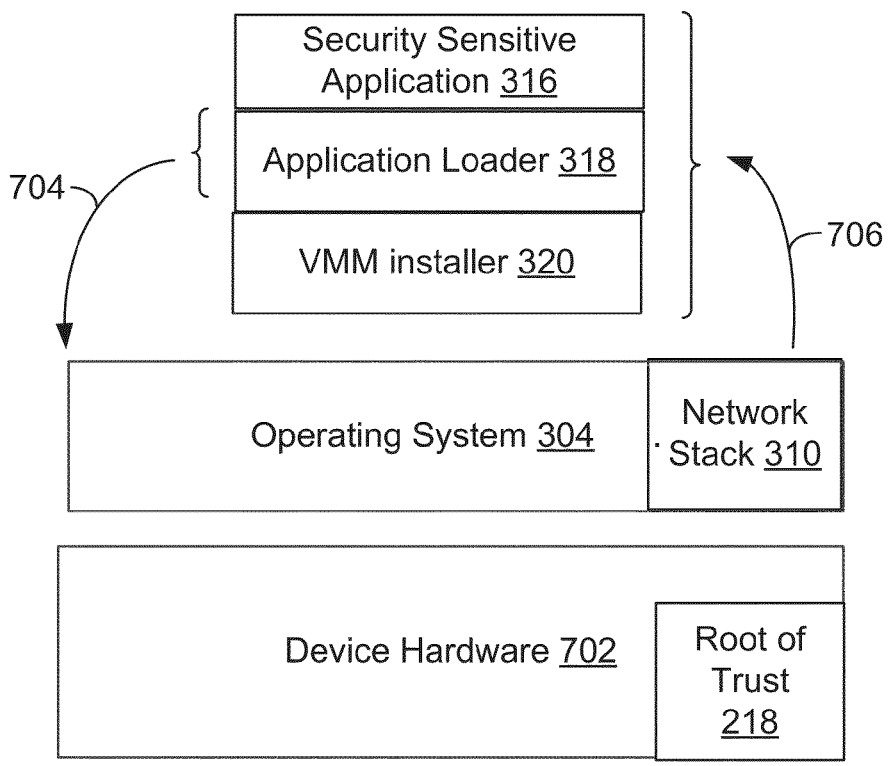

FIG. 7B illustrates a two way authentication performed between the application module and the operating environment on the mobile device 102. At Step 704, (as also discussed in step 404 of FIG. 4), the OS authentication module 324 of the application loader 318 verifies the operating environment of the mobile device 102 before proceeding with the installation of the application. The OS authentication module 324 may use signatures stored at the Root of Trust 218 for verifying the operating system 304 or crucial components of the operating system 304. On the other hand, at Step 706, (as discussed at Step 405 and 406 of FIG. 4), the mobile device 102 via the operating system 304 also verifies the authenticity and integrity of the application module 314 before proceeding with the installation.

Performing a two way authentication is advantageous to protect the user of the mobile device 102. For example, if the mobile device 102 or the operating system installed on the mobile device 102 is compromised, installing a security sensitive application 316, such as a payment application on the mobile device 102 would expose sensitive user information through the payment application to theft or misuse. Therefore, if the application loader 318 discovers that crucial components of the operating system 304 are compromised the application loader 318 denies installation of the security sensitive application 316 on the mobile device 102.

Similarly, if the application module 314 downloaded is either tampered or is malicious it can expose sensitive user information by masquerading as a legitimate application approved by the vendor and gaining access to sensitive user information. Furthermore, installing a malicious application module on the device can also compromise the device and expose any other sensitive information already stored on the mobile device 102.

Therefore the two way authentication protects sensitive user information by ensuring that the both the operating environment, such as crucial portions of the operating system 304 and also the application module 314 are not malicious before proceeding with the installation of the application.

Figure 7C:
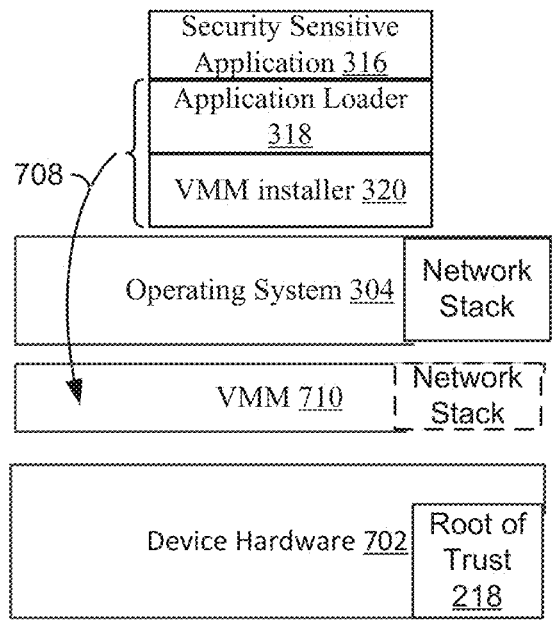

FIG. 7C illustrates the installation of the virtual machine monitor (VMM) 710 on the mobile device 102. After the crucial components of the operating system 304 and the application module 314 are authenticated, the VMM 710 is installed on the mobile device 102. Once the TEE discovery module 328 of the application loader 318 discovers that the mobile device 102 supports virtualization technology and decides to virtualize the trusted execution environment on the mobile device 102, the application loader 318 may initiate the VMM installer 320 to install the VMM 710 on the mobile device 102.

As shown in FIG. 7C, at Step 708 the application loader logically installs the VMM 710 between the device hardware and the operating system 304. In one implementation, the VMM 710 may host the operating system 304 inside a separate virtual machine. The VMM may install its own network stack for securely communicating with trusted entities or it may use the already authenticated network stack 310 of the operating system 304 for securely communicating. The installation of the VMM may be transparent to operating system 304.

Figure 7D:
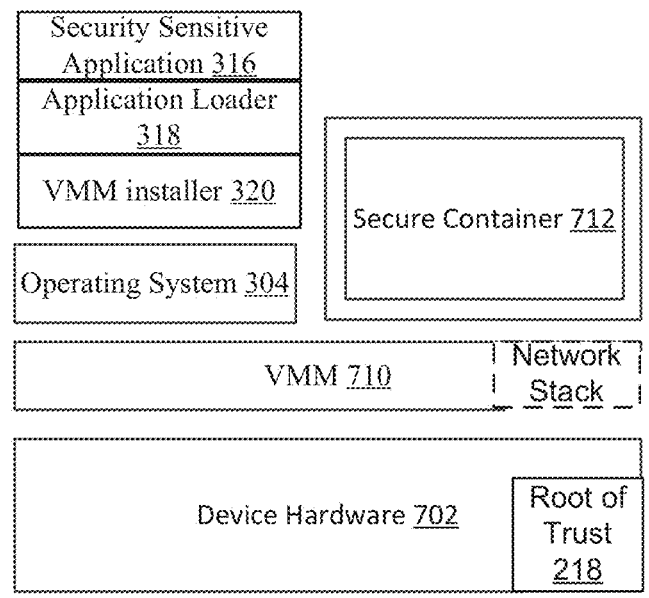

As shown in FIG. 7D, the VMM 710 creates a new virtual machine that provides a secure container 712 for installing and securely executing the security sensitive application 316. The secure container 712 may have dedicated physical resources, such as paging structures, memory, storage, hardware registers and buffers, logically isolated from the operating environment of the operating system and other applications to protect the security sensitive application and its associated state from any tampering. The resources of the secure container 712 are managed either by the VMM 710 or under the close supervision of the VMM 710 by the operating system 304.

Figure 7E:
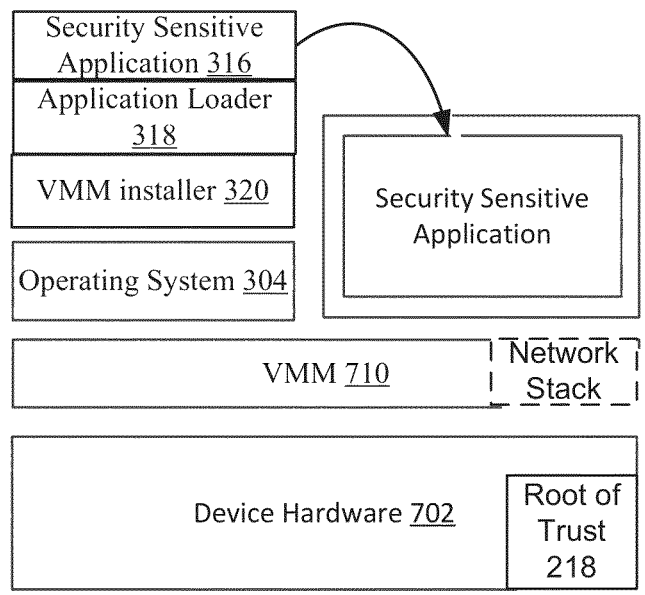
Figure 7F:
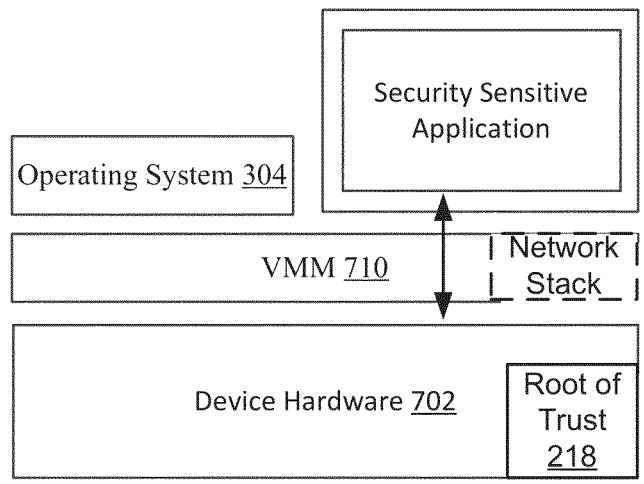

In FIG. 7E, the security sensitive application 316 is installed in the secure container 712 from the application module 314. In FIG. 7F, the application module 314 may be removed from the system once the application is installed. The security sensitive application may notify the user via a user interface that the security sensitive application is installed and is ready for use by the user.

It may be advantageous to virtualize the trusted execution environment. A virtualized trusted execution environment can be implemented in a more cost effective manner using hardware support and/or software and firmware. In addition, an implementation that is primarily based in software may also be more power efficient. The isolation properties enabled by virtualization technology can also provide security that is comparable to the hardware standalone solutions without the associated costs. Furthermore, software solutions may also enable easier migration of the state of the trusted execution environment from one device to another, as discussed in more detail in FIGS. 13 and 14.

Figure 8:
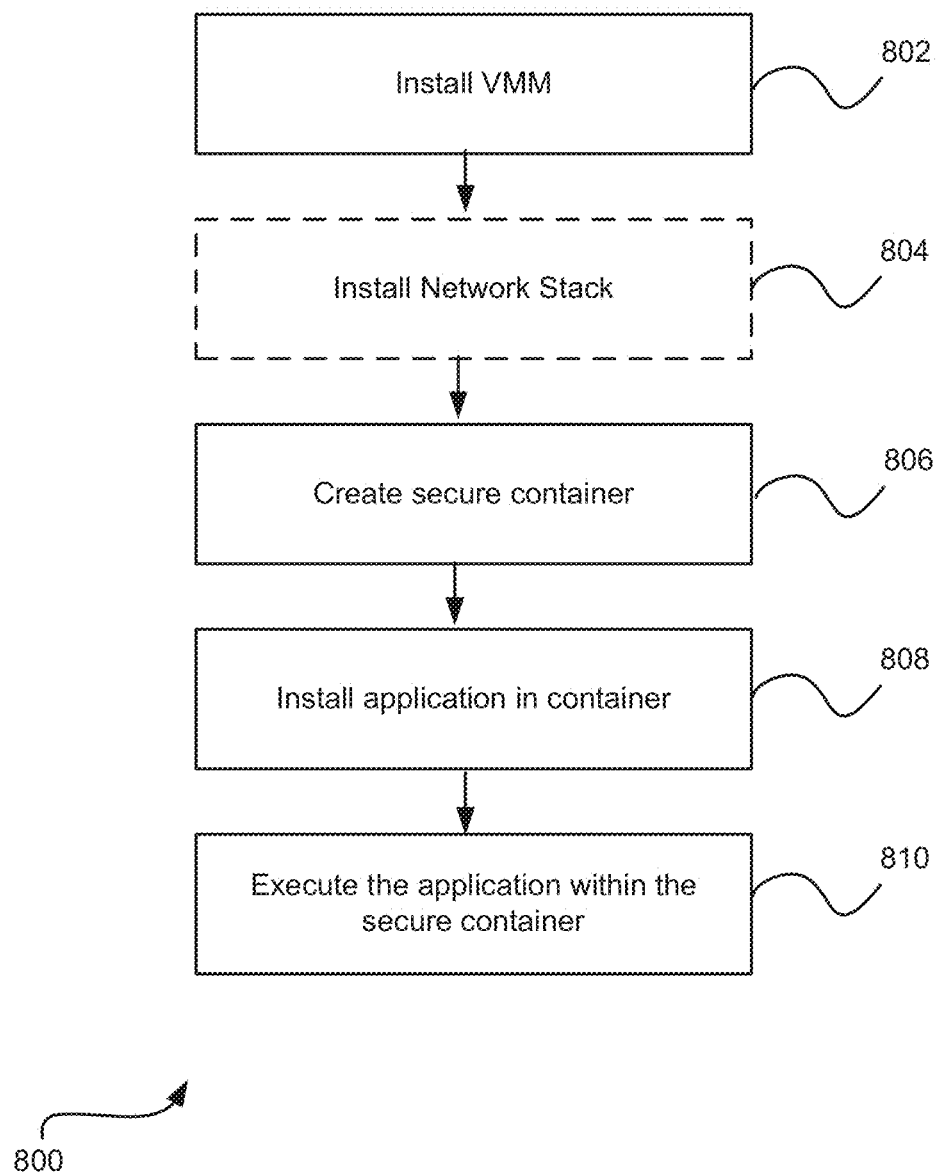
FIG. 8 illustrates an exemplary flow diagram for installation of the application using a secure container according to embodiments of the invention.

FIG. 8 illustrates an exemplary flow diagram for installation of the application using virtualization technology, according to one embodiment of the invention. The method 800 is performed by processing logic that comprises hardware (circuitry, dedicated logic, etc.), software (such as is run on a general purpose computing system or a dedicated machine), firmware (embedded software), or any combination thereof. In one embodiment, the method 800 is performed by device 102 of FIG. 2.

At step 802, components residing on the mobile device 102, such as the application loader 318 and the VMM installer 320 may install the VMM 710 between the operating system 304 and the device hardware 702.

At step 804, optionally the VMM 710 may install its own network stack for securely communicating with trusted entities or it may use the already authenticated network stack 310 of the operating system 304 for securely communicating.

At step 806, the VMM 710 creates a new virtual machine that provides a secure container 712 for installing and securely executing the security sensitive application 316. The secure container 712 may have dedicated physical resources, such as paging structures, memory, storage, hardware registers and buffers, logically isolated from the operating environment of the operating system and other applications to protect the security sensitive application and its associated state from any tampering.

At step 808, components residing on the mobile device 102, install the security sensitive application 316 in the secure container 712 from the application module 314. At Step 810, the security sensitive application 316 is executed within the secure container 712.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

III. Execution of a Security Sensitive Application

Techniques described herein allow a computer system, such as a server computer to detect anomalies with the execution of a trusted execution environment. In one embodiment, a second instance of the trusted execution environment may be initiated on a server computer residing on the cloud. The second instance of the trusted execution environment may be used for detecting anomalies in the execution of the trusted execution environment on the mobile device 102.

Figure 9:
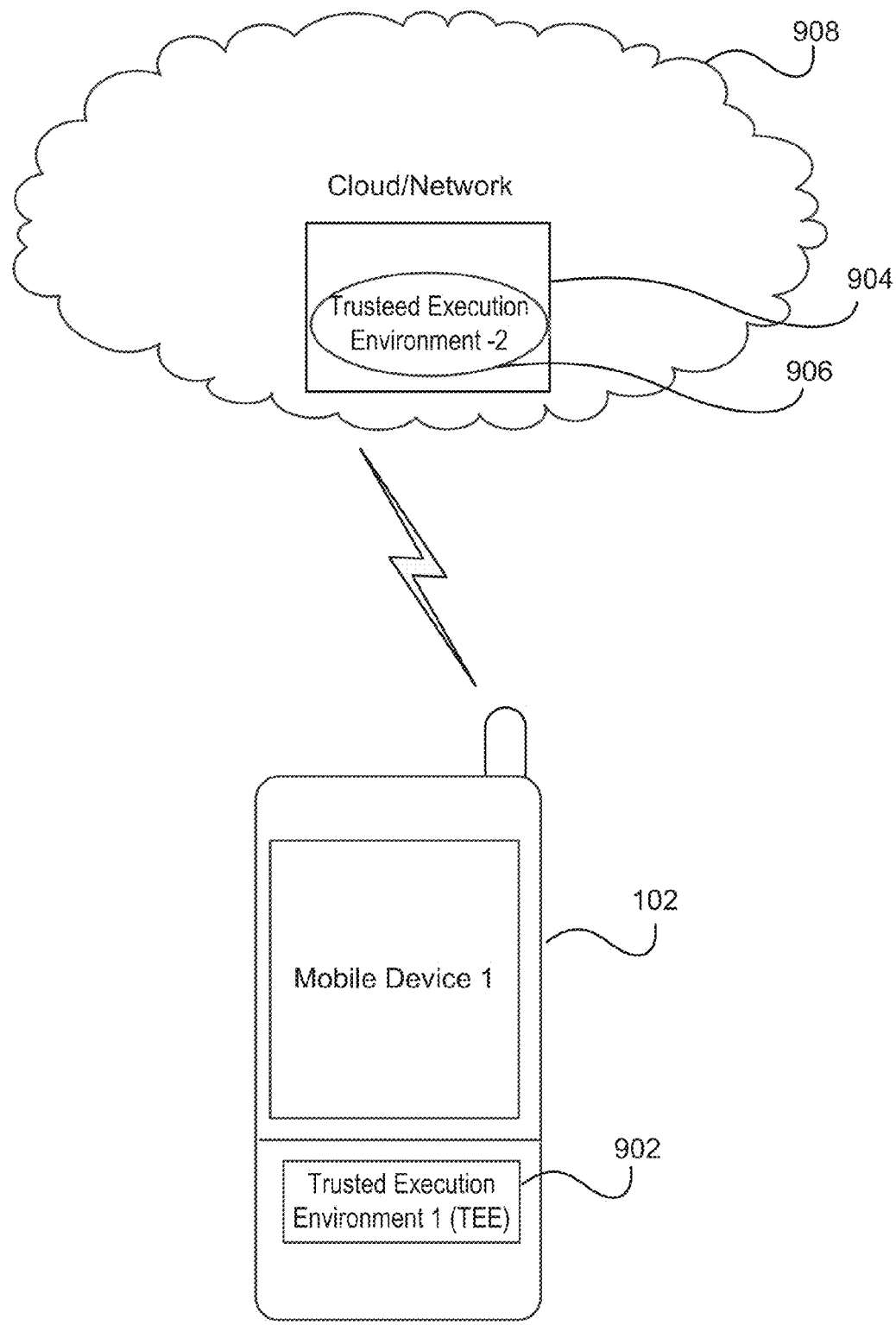
FIG. 9 depicts a system implementing an exemplary embodiment of the invention for executing multiple instances of a trusted execution environment.

FIG. 9 depicts a system implementing an exemplary embodiment of the invention for executing instances of a trusted execution environment. A first instance of the trusted execution environment 902 is maintained and executed on the mobile device 102. A second instance of the trusted execution environment 906 may be implemented and executed on a server computer 904 in a network as a part of the network resources 908. The pool of network resources may be referred to as a "cloud." In one embodiment, the second instance of the trusted execution environment 906 may be initiated if an anomaly in the execution of the first instance of the trusted execution environment on the mobile device 102 is detected.

In another embodiment, the second instance of the trusted execution environment 906 may be initiated at the time of provisioning of the device.

As described herein, the mobile device 102 executes a first instance of a trusted execution environment 902 and the server computer 904 residing in the cloud 908 may execute a second instance of the trusted execution environment 906. An instance of a trusted execution environment may refer to an image or copy of the executable code that can be executed on devices with varying hardware capabilities, while providing same or similar functionality. However, the first instance of a trusted execution environment 902 may be referred to as the first trusted execution environment 902 and the second instance of a trusted execution environment 906 may be referred to as a second trusted execution environment 906, and may be used interchangeably used throughout the specification. In some implementations, the two devices (e.g., mobile device 102 and server computer 904) may in fact implement two separate trusted execution environments (e.g., secure element and virtualized trusted execution environment), however, still providing same or similar functionality, and may still be referred to as a first trusted execution environment 102 and a second trusted execution environment 904, without departing from the scope of the invention.

In one aspect, a secure communication channel between the first instance of the trusted execution environment 902 executing on the mobile device 102 and the second instance of the trusted execution environment 906 executing on the server computer 904 is established. The secure communication channel may be initiated by the server computer 904 residing in the cloud 908 or the mobile device 102. A synchronizing event may be generated for synchronizing a first state associated with the first instance of the trusted execution environment 902 on the mobile device and a second state associated with the second instance of the trusted execution environment 906 on the server computer 904. The synchronizing event may be generated either by the mobile device 102 or the server computer 9047 residing in the cloud.

In one embodiment, the server computer 904 compares the first state associated with the first instance of the trusted execution environment 902 executing on the mobile device 102 with the second state associated with the second instance of the trusted execution environment 906 executing on the server computer 904. The server computer 904 may detect any differences or anomalies in the execution of the first state as compared to the second state of the trusted execution environment and determine that the difference in the states of the trusted execution environment between the device and the server computer 904 is due to a compromised device. A compromised device may no longer be safe for storing secrets and executing security sensitive applications.

The state of a trusted execution environment may include, but is not limited to one or more of the executable code for the trusted execution environment, the data associated with execution of one or more applications in the trusted execution environment, executable code for the applications, and the state of the applications.

For example, a payment application may store state, such as account numbers, account balance, expiration date, user name, user date of birth, and recent transactions. An unexpected change in the executable code for the payment application or one of the data fields may result in a detection of a discrepancy or anomaly in the states of the trusted execution environment. The anomaly or discrepancy may be detected by comparing the state of the trusted execution environment on the mobile device 102 and the server computer 904.

In one embodiment, the server computer 904 may send a message over the secure communication channel to the device to deactivate the first instance of the trusted execution environment 902 upon detection that the mobile device 102 has been compromised. The server computer 904 may also send a message requesting disassociation of an owner of the device and the device, upon receiving a notification that the device has been lost or stolen. In response to a message to deactivate the trusted execution environment on the mobile device 102, the trusted execution environment may remove secrets and secure applications from the device and tear down the trusted execution environment. In addition to tearing down the trusted execution environment, the server computer 904 may also request the mobile device 102 to lock the mobile device 102, reset the mobile device 102, provide the location of the mobile device 102 or any other such request that diminishes the functionality of the mobile device 102 and may also enable procuring the lost or stolen device.

Executing concurrent and/or synchronized (or near synchronized) versions of the trusted execution environment on the mobile device 102 and the server computer 904 is advantageous, since it allows an instance of the trusted execution environment to operate on the server computer 904, in a very controlled environment significantly reducing the risk that the trusted execution environment can be tampered with or hacked into. Verifying, at the server computer 904, the state of the trusted execution environment 902 executing at the mobile device 102 with the state the trusted execution environment 906 executing at the server computer 904 (that has a high confidence associated with it) allows for significantly more robust security, since not only is the application running in a trusted execution environment on the mobile device 102, but it is being periodically verified against a synchronized version in the cloud 908 on a secure server computer 904.

In is also advantageous to have an instance of the trusted execution environment operating on the mobile device 102 so that the mobile device 102 can still operate security sensitive applications while not connected to a network or a cloud.

Figure 10:
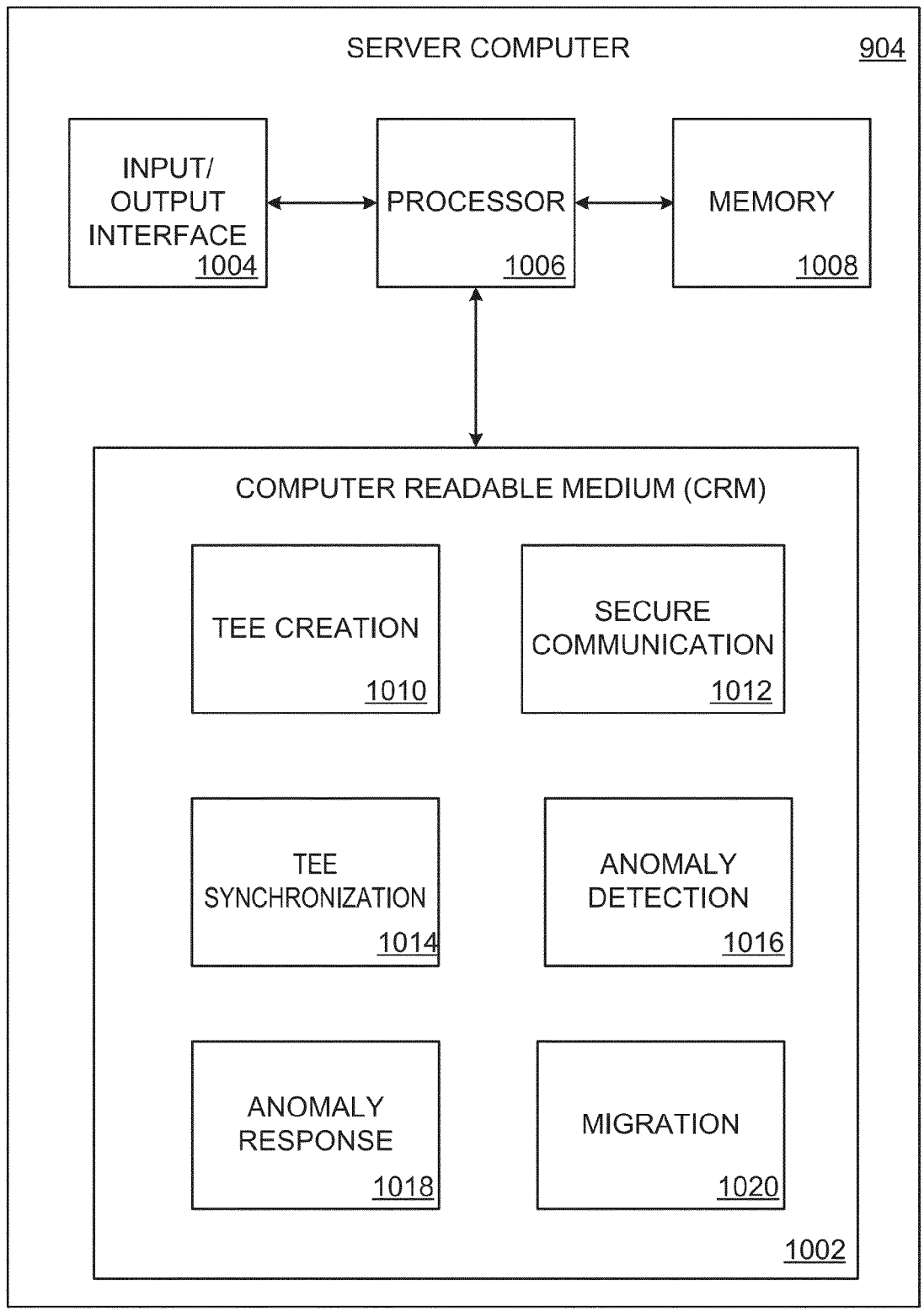
FIG. 10 illustrates at least some of the elements of an exemplary server computer in accordance with embodiments of the invention.

FIG. 10 illustrates at least some of the elements of an exemplary server computer 904 in accordance with embodiments of the invention. In some embodiments, the server computer 904 may comprise a processor 1006 and a computer readable medium 1002 coupled to the processor 1006. The computer readable medium 1002 comprises code, executable by the processor 1006 for implementing a method comprising at least establishing a secure communication channel between a first trusted execution environment executing on a server computer 904 and a second trusted execution environment executing on a first mobile device 102, comparing a first state associated with the first trusted execution environment and a second state associated with the second trusted execution environment using the secure communication channel, and detecting a difference in the first state associated with the first trusted execution environment and the second state associated with the second trusted execution environment.

The server computer 904 may be configured to establish a secure communication channel with the mobile device 102, communicate synchronization information with the mobile device 102 and send signaling information to the mobile device 102. The server computer 904 may comprise an input-output (IO) interface 1004, which may be configured to interface with the mobile device 102. The server computer 904 may also comprise a processor 1006 that may be configured to execute instructions or code in order to implement methods, processes or operations, as well as a memory 1008. The memory 1008 may comprise any combination of volatile and/or non-volatile memory such as, for example, buffer memory, RAM, DRAM, ROM, flash, or any other suitable memory device.

The computer readable medium (CRM) 1002 may comprise code, executable by the processor 1006 for implementing methods using embodiments of the invention. The computer readable medium 1002 may comprise a TEE creation module 1010, a secure communication module 1012, TEE synchronization module 1014, an anomaly detection module 1016, an anomaly response module 1018, and a TEE migration module 1020.

The TEE creation module 1010 may be configured to create an instance of a trusted execution environment for every mobile device activated to securely synchronize the trusted execution environments. The trusted execution environment may be implemented as a secure element on a mobile device 102, on a SIM card or using virtualization technology, as discussed previously. In one implementation, the server computer 904 may virtualize the trusted execution environment using one or more steps described in FIG. 7 and FIG. 8. In one embodiment, the instance of the trusted execution environment 906 executing on the server may be initiated if an anomaly in the execution of the instance of the trusted execution environment 902 on the mobile device 102 is detected. In another embodiment, the second instance of the trusted execution environment 906 may be initiated at the time of provisioning of the device.

The secure communication module 1012 may be configured to establish a secure communication channel between the first instance of the trusted execution environment executing 906 on the server computer 904 and the second instance of the trusted execution environment 902 executing on the mobile device 102. The secure communication channel may be initiated by the server computer 904 residing in the cloud 908 or the mobile device 102.

The TEE synchronization module 1014 may be configured to generate a synchronizing event for synchronizing a first state associated with the first instance of the trusted execution environment 902 on the mobile device and a second state associated with the second instance of the trusted execution environment 906 on the server computer 904. Even though, in FIG. 10 the synchronization event is generated by the server computer 904, the synchronization event may be generated either by the mobile device 102 or the server computer 904 residing in the cloud. The synchronization event may be in response to any changes in the state due to user actions, such as a payment transaction, update of account information, etc., or expiration of a period timer.

The anomaly detection module 1016 may be configured to compare the first state associated with the first instance of the trusted execution environment 906 executing on the server computer 904 and the second state associated with the second instance of the trusted execution environment 902 executing on the mobile device 102.

The anomaly response module 1018 may be configured to detect any differences or anomalies in the execution of the first state as compared to the second state of the trusted execution environment and determine that the difference in the states of the trusted execution environment between the mobile device 102 and the server computer 904 is due to a compromised device. A compromised device may no longer be safe for storing secrets and executing secure applications. The anomaly response module 1018 may send a message over the secure communication channel to the device to deactivate the first instance of the trusted execution environment 902 upon detection that the device has been compromised. The anomaly response module 1018 may also request the mobile device 102 to lock the device, reset the mobile device 102, provide the location of the mobile device 102 or any other such request that diminishes the functionality of the mobile device 102 and may also enable procuring the lost or stolen device.

Figure 13:
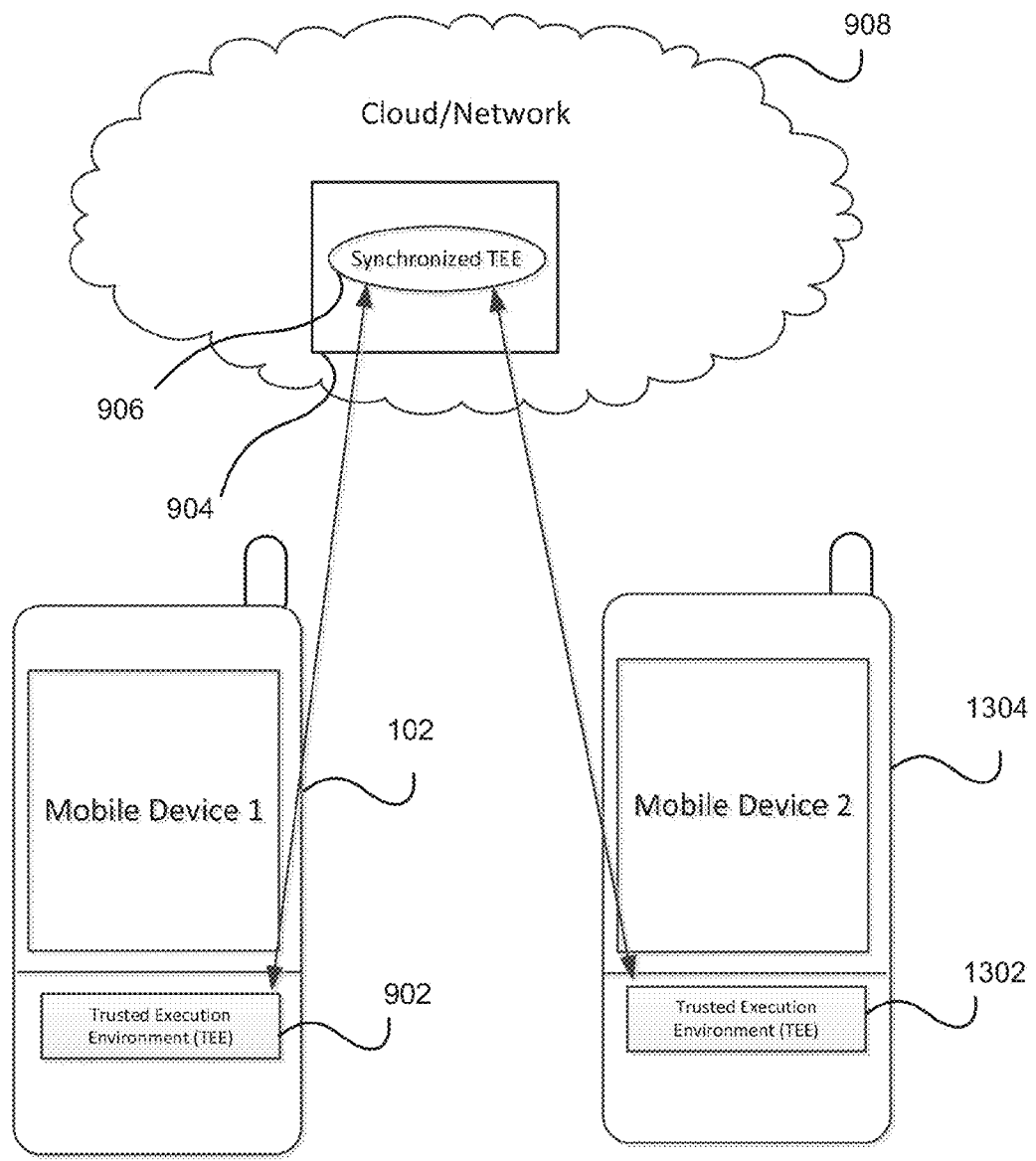
FIG. 13 depicts a system implementing an exemplary embodiment of the invention for migration of the trusted execution environment from a first device to a second device.
Figure 14:
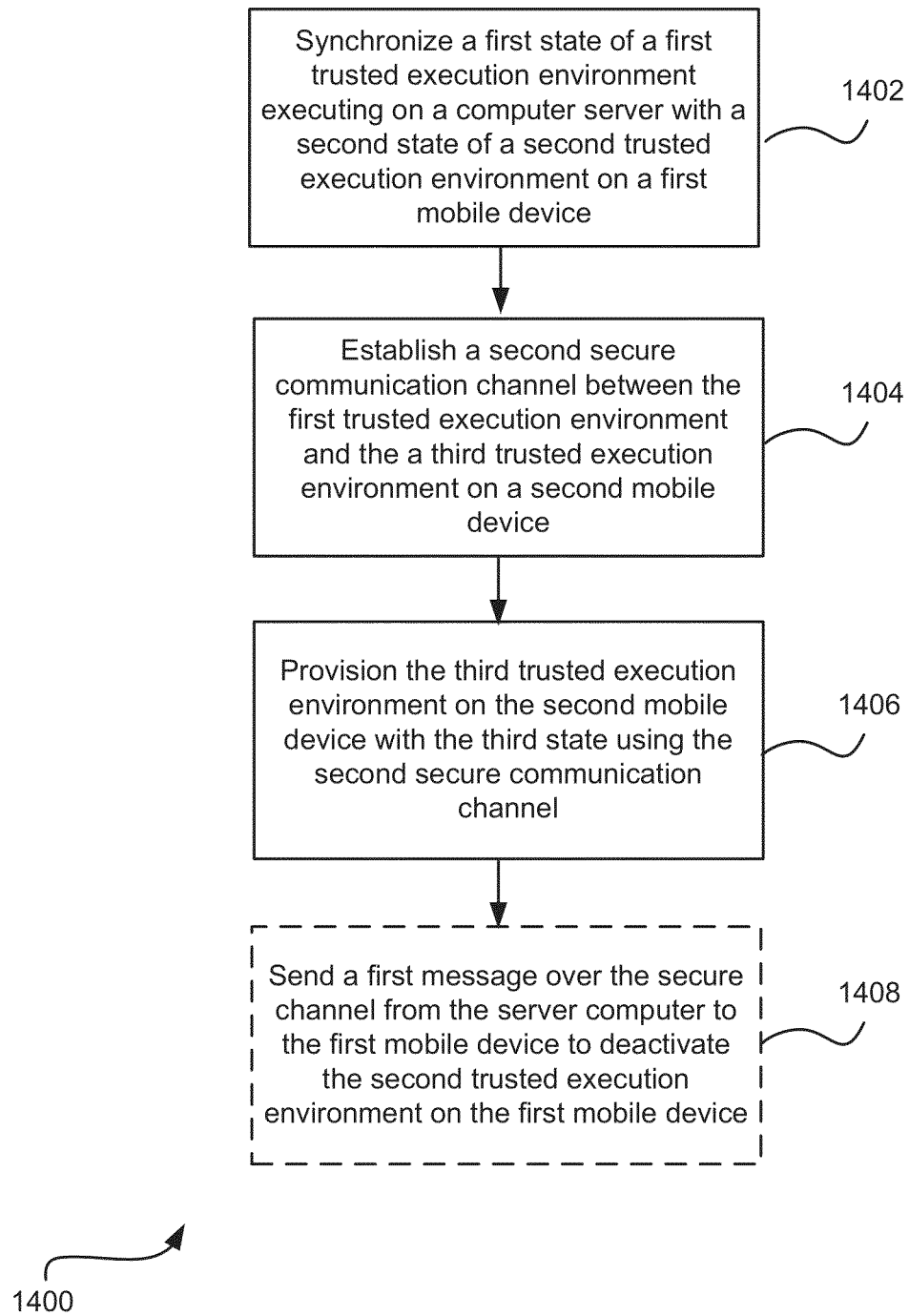
FIG. 14 depicts an exemplary flow diagram according to one of the embodiments of the invention for migration of the trusted execution environment from a first device to a second device.

The TEE migration module 1002, as discussed in greater detail in FIG. 13 and FIG. 14, may be configured to enable migration of the state associated with the first instance of the trusted execution environment 902 from the first mobile device to a second mobile device.

Figure 11:
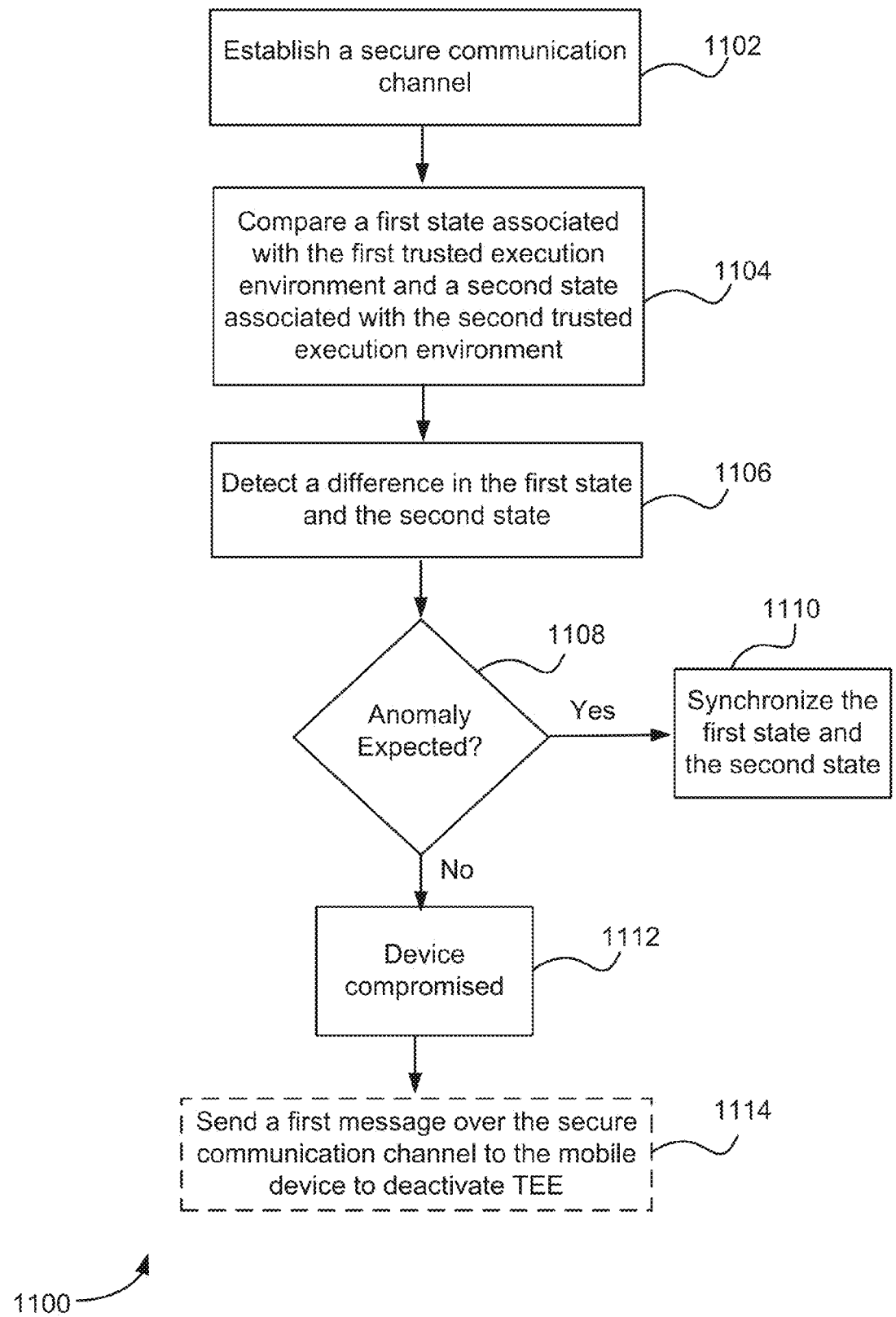
FIG. 11 illustrates an exemplary flow diagram for implementing an exemplary embodiment of the invention for executing multiple instances of a trusted execution environment.

FIG. 11 is a simplified flow diagram, illustrating a method 1100 for synchronizing the trusted execution environment between a mobile device and a server computer. The method 1100 is performed by processing logic that comprises hardware (circuitry, dedicated logic, etc.), software (such as is run on a general purpose computing system or a dedicated machine), firmware (embedded software), or any combination thereof. In one embodiment, the method 1100 is performed by device 904 of FIG. 10.

At step 1102, components of the server computer 904, such as the secure communication module 1012, may facilitate establishing a secure communication channel between a first trusted execution environment 906 executing on a server computer 904 and a second trusted execution environment 902 executing on a first mobile device 102. Before establishment of the secure communication channel, the server computer 904 may use an already existing trusted execution environment or generate an instance of a trusted execution environment using one or more method described above.

At step 1104, components of the server computer 904, such as the anomaly detection module 1016, may compare a first state associated with the first trusted execution environment 906 and a second state associated with the second trusted execution environment 902 using the secure communication channel. At Step 1106, the server computer 904 may detect a difference in the first state associated with the first trusted execution environment 906 and the second state associated with the second trusted execution environment 902.

At step 1108, components of the server computer 904, such as the anomaly response module 1018, may determine if the detected difference or anomaly can be verified or if the change was expected. For example, in response to a payment transaction at the mobile device, the state of the trusted execution environment at the mobile device 102 may change. An expiration of a timer or the change on the mobile device 102 may trigger a synchronization event. In response to the synchronization event, the server computer 904 may first determine a change in the state and then verify if the change in the state of the trusted execution environment at the mobile device is valid by validating the transaction (e.g., through a PPN) or regarding the change in state as low-risk.

If the difference in state was expected, then at step 1110, the anomaly response module 1018 may synchronize the first state and the second state of the trusted execution environments.

However, if the difference in the states of the trusted executed environments was not expected, or cannot be verified, or is considered as a high-risk anomaly (e.g., an unapproved transaction above $15000), the server computer 904, at step 1112, may determine that the mobile device 102 is compromised.

At step 1114, components of the server computer 904, such as the anomaly response module 1018, may send a first message over the secure communication channel to the mobile device 102 to deactivate the trusted execution environment 902 on the mobile device 102. The server computer 904 may also send a message requesting disassociation of an owner of the device and the device, upon receiving a notification that the device has been lost or stolen. In response to a message to deactivate the trusted execution environment on the device, the trusted execution environment may remove secrets and secure applications from the device and tear down the trusted execution environment. In addition to tearing down the trusted execution environment, the server computer 904 may also request the mobile device 102 to lock the device, reset the mobile device 102, provide the location of the mobile device 102 or any other such request that diminishes the functionality of the mobile device 102 and may also enable procuring the lost or stolen device.

It should be appreciated that the specific steps illustrated in FIG. 11 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

Figure 12:
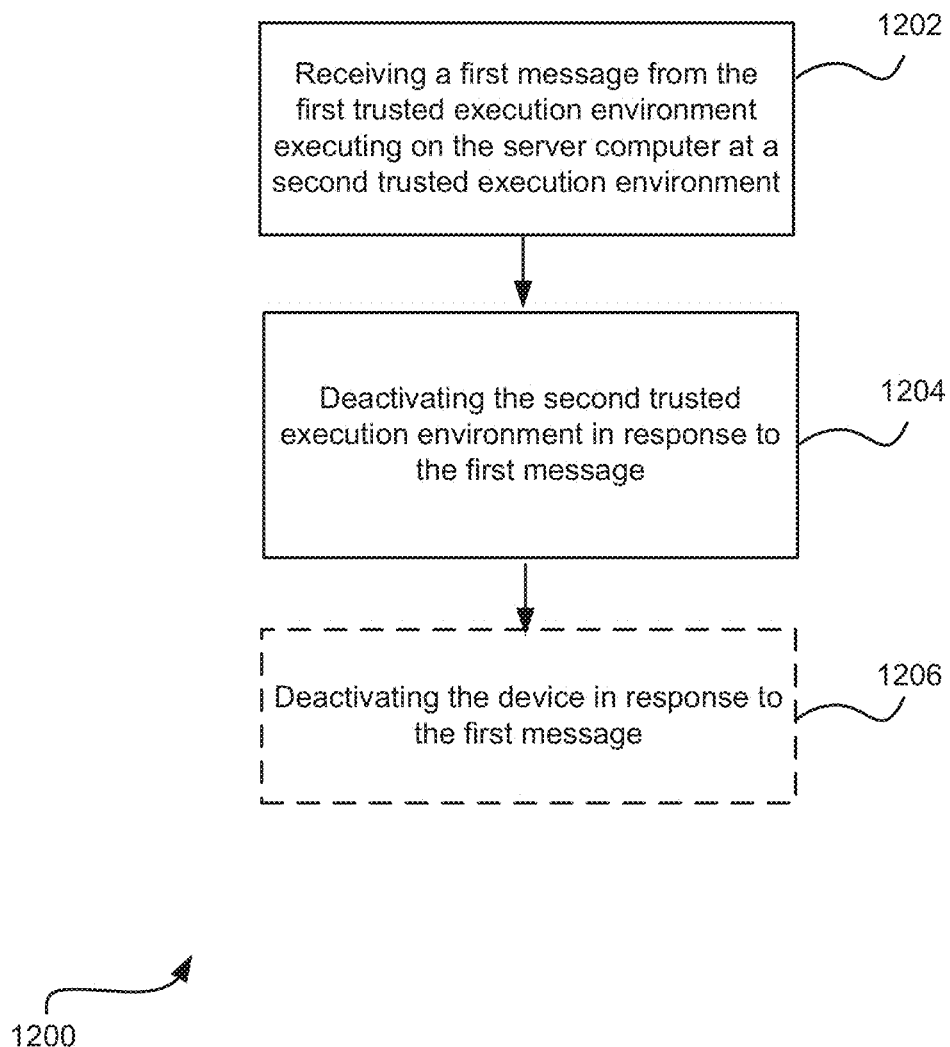
FIG. 12 illustrates an exemplary flow diagram for implementing an embodiment of the invention for deactivating a mobile device.

FIG. 12 is a simplified flow diagram, illustrating a method 600 for synchronizing the trusted execution environment between a mobile device and a server computer. The method 1200 is performed by processing logic that comprises hardware (circuitry, dedicated logic, etc.), software (such as is run on a general purpose computing system or a dedicated machine), firmware (embedded software), or any combination thereof. In one embodiment, the method 1200 is performed by device 102 of FIG. 2.

At step 1202, components of the mobile device 102, such as the deactivation module 332, may receive a first message from the trusted execution environment 906 executing on the server computer 904 at a second trusted execution environment 902, indicating that the mobile device 102 has been compromised.

At step 1204, in response to receiving the first message the deactivation module 332, may deactivate the second trusted execution environment 902 on the mobile device 102. Deactivating the trusted execution environment 902 may include removing secrets and secure applications from the mobile device 102 and tearing down the trusted execution environment Optionally, at step 1206, the deactivation module 332 may also deactivate the device and perform additional steps to secure the user's information, such as lock the device, reset the information on the mobile device 102, provide the location of the mobile device 102 or any other such tasks that diminishes the functionality of the mobile device 102 and may also enable procuring/recovering the compromised, lost, or stolen device.

It should be appreciated that the specific steps illustrated in FIG. 12 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1200.

IV. Migration of a Trusted Execution Environment

Current implementations of the trusted execution environments are mostly limited to hardware and are severely constrained in terms of management and migration of the security sensitive information and offer no path for migrating the state of a trusted execution environment from one device to another. For example, if a mobile device is lost, stolen or compromised, the current solutions provide no way of deactivating the trusted execution environment on the mobile device. Furthermore, current techniques do not provide a way of transferring the contents or state of the trusted execution environment from one device to another. Today, a user is burdened with re-entering all the security sensitive information and re-provisioning the trusted execution environment on the new mobile device for any potential security sensitive applications.

In some situations, the trusted execution environment on the old device may not even be accessible in instances where the device or the trusted execution environment is locked or dysfunctional and the user's information may be lost forever.

Techniques discussed herein disclose a system for migrating a trusted execution environment or the state associated with the trusted execution environment from one device to another.

FIG. 13 depicts a system implementing an exemplary embodiment of the invention for migration of the trusted execution environment from a first mobile device 102 to a second mobile device 1304. Migration of the trusted execution environment may refer to the migration of the contents or state of the trusted execution environment. The consumer may initiate a request for migration of the trusted execution environment to a second device to replace or upgrade a device. Other reasons for the migration may include a lost, stolen, broken or compromised device that needs replacement. Migration of the trusted execution environment allows easy re-provisioning of the device without cumbersome manual steps for provisioning the device.

In some embodiments, a request for migration of the trusted execution environment from one device to another may trigger an event to synchronize the instances of the trusted execution environments on the first mobile device 102 and the server computer 904. However, in other embodiments, the server computer 904 determines that the trusted execution environment on the server computer 904 and the first device are already synchronized or that the first mobile device 102 is compromised and the server computer 904 may not re-synchronize the trusted execution environment on the server computer 904 with the first mobile device 102.

The server computer 904 may generate a third instance of the trusted execution environment using the first state of the first instance of the trusted execution environment 906 executing on the server computer 904 and provisions the third instance of the trusted execution environment 1306 on a second mobile device 1304 using a second secure communication channel.

Migrating the trusted execution environment through a secure and trusted server that always maintains a synchronized or close to synchronized state of the trusted execution environment executing on the mobile device 102 is advantageous, since this ensures that the state and the contents of the trusted execution environment are always preserved regardless of the state (e.g., lost, stolen, broken) of the old mobile device 102 and can be migrated to a new mobile device.

FIG. 14 is a simplified flow diagram, illustrating a method 600 for synchronizing the trusted execution environment between a mobile device and a server computer. The method 1400 is performed by processing logic that comprises hardware (circuitry, dedicated logic, etc.), software (such as is run on a general purpose computing system or a dedicated machine), firmware (embedded software), or any combination thereof. In one embodiment, the method 1400 is performed by device 904 of FIG. 9.

At step 1402, components of the server computer 904, such as the migration module 1020, may synchronize a first state of a first trusted execution environment 906 executing on a server computer 904 with a second state of a second trusted execution environment 902 on a first mobile device 102. At Step 1404, components of the same server computer 904 or a different server computer in the cloud 908 may generate a third state associated with a third trusted execution environment.

At step 1404, components of the server computer 904, may establish a second secure communication channel between the first trusted execution environment 904 and a third trusted execution environment on a second mobile device 1302.

At step 1406, components of the server computer 904, may provision the third trusted execution environment on the second mobile device with a third state using the second secure communication channel, wherein the third state is generated using the first state from the server computer 904.

Optionally, at step 1408, the server computer 904, may send a first message over the first secure communication channel to the first mobile device 102 to deactivate the second trusted execution environment 902 on the first mobile device 102.

It should be appreciated that the specific steps illustrated in FIG. 14 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1400.

An example of a server computer 904 may include a processor 1006 and a computer readable medium 1002 coupled to the processor 1006, the computer readable medium 1002 comprising code, executable by the processor 1006 for implementing a method that may include establishing a secure communication channel between a first trusted execution environment executing on a server computer and a second trusted execution environment executing on a first mobile device, comparing a first state associated with the first trusted execution environment and a second state associated with the second trusted execution environment using the secure communication channel, and detecting a difference in the first state associated with the first trusted execution environment and the second state associated with the second trusted execution environment.

In one implementation of the server computer 904, the server computer 904 synchronizes the first state associated with the first trusted execution environment on the server computer and the second state associated with the second trusted execution environment on the first mobile device.

In another implementation of server computer 904, the server computer 904 determines that the second trusted execution environment executing on the first mobile device is compromised based on the detected differences between the first state and the second state.

In yet another implementation of the server computer 904, the server computer 904 generates a third state of the trusted execution environment using the first state of the first trusted execution environment executing on the server computer, establishes a second secure communication channel between the first trusted execution environment and a third trusted execution environment on a second mobile device, and provisions the third trusted execution environment on the second mobile device with the third state using the second secure communication channel.

The server computer 904 may send a first message over the secure channel from the server computer to the first mobile device to deactivate the second trusted execution environment on the first mobile device. In some scenarios, the first message may be sent in response to determining that the first mobile device is one or more of compromised, lost, stolen or being upgraded.

FIG. 15 is a high level block diagram of a computer system that may be used to implement any of the entities or components described herein. The subsystems shown in FIG. 15 are interconnected via a system bus 1502. Additional subsystems include a printer 1510, keyboard 1518, fixed disk 1520, and monitor 1512, which is coupled to display adapter 1514. Peripherals and input/output (I/O) devices, which couple to I/O controller 1504, can be connected to the computer system by any number of means known in the art, such as a serial port. For example, serial port 1516 or external interface 1522 can be used to connect the computer apparatus to a wide area network such as the Internet, a mouse input device, or a scanner. The interconnection via system bus 1502 allows the central processor 1508 to communicate with each subsystem and to control the execution of instructions from system memory 1506 or the fixed disk 1520, as well as the exchange of information between subsystems. The system memory 1506 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method for installing an application for secure execution on a mobile device, the method comprising:
    authenticating, by the mobile device, an application module downloaded by the mobile device, wherein the application module comprises an application loader and the application;
    authenticating, by the mobile device, using the application loader, at least one portion of an operating system;
    discovering, using the application loader, mobile device support for one or more trusted execution environments; and
    installing, at the mobile device, the application in at least one trusted execution environment from the one or more trusted execution environments using the application loader.

2. The method of claim 1, wherein the application loader from the application module initiates the authentication of the at least one portion of the operating system.

3. The method of claim 1, wherein the authentication of the at least one portion of the operating system is initiated in response to a request to install the application.

4. The method of claim 1, wherein the authenticating the at least one portion of the operating system comprises:
    performing a cryptographic measurement of the at least one portion of the operating system; and
    comparing the cryptographic measurement against a stored value on the device.

5. The method of claim 1, wherein authenticating the application module comprises:
    performing a cryptographic measurement of the application module; and
    comparing the cryptographic measurement against a value retrieved from an at least one trusted entity using a secure communication channel.

6. The method of claim 5, wherein the at least one trusted entity is one or more of a mobile operating network, a payment processing network, an issuer, a financial institution and a merchant.

7. The method of claim 5, wherein the value is received from the trusted entity using a secure communication channel, wherein the secure communication channel is created between the mobile device and the trusted entity using an authenticated network stack, and wherein the network stack is authenticated as part of authenticating the at least one portion of the operating system.

8. The method of claim 1, wherein the application module is authenticated by the operating system.

9. The method of claim 1, wherein installing the application comprises:
creating a secure container within an authenticated operating environment, wherein the operating environment manages a plurality of hardware resources for the secure container;
installing the application within the secure container.

10. The method of claim 9, wherein the secure container is a virtual machine and the authenticated operating environment is a virtual machine monitor.

11. A mobile device, comprising:
a processor; and
a computer readable medium coupled to the processor, the computer readable medium comprising code, executable by the processor for implementing a method comprising:
receiving an application module, wherein the application module comprises an application loader and an application and wherein the application loader comprises code for:
initiating authentication of at least a portion of an operating system using the application loader;
discovering mobile device support for one or more trusted execution environments; and
installing, at the mobile device, the application in at least one trusted execution environment from the one or more trusted execution environments.

12. The mobile device of claim 11, wherein the application loader from the application module initiates the authentication of the at least one portion of the operating system.

13. The mobile device of claim 11, wherein the authentication of the at least one portion of the operating system is initiated in response to a request to install the application.

14. The mobile device of claim 11, wherein the authenticating the at least one portion of the operating system comprises:
performing a cryptographic measurement of the at least one portion of the operating system; and
comparing the cryptographic measurement against a stored value on the mobile device.

15. The mobile device of claim 11, wherein authenticating the application module comprises:
performing a cryptographic measurement of the application module; and
comparing the cryptographic measurement against a value retrieved from an at least one trusted entity using a secure communication channel.

16. The mobile device of claim 15, wherein the at least one trusted entity is one or more of a mobile operating network, a payment processing network, an issuer, a financial institution and a merchant.

17. The mobile device of claim 15, wherein the value is received from the trusted entity using a secure communication channel, wherein the secure communication channel is created between the mobile device and the trusted entity using an authenticated network stack, and wherein the network stack is authenticated as part of authenticating the at least one portion of the operating system.

18. The mobile device of claim 11, wherein the application module is authenticated by the operating system.

19. The mobile device of claim 11, wherein installing the application comprises:
creating a secure container within an authenticated operating environment, wherein the operating environment manages a plurality of hardware resources for the secure container; and
installing the application within the secure container.

20. The mobile device of claim 19, wherein the secure container is a virtual machine and the authenticated operating environment is a virtual machine monitor.

* * * * *